(12) United States Patent
Harris

(10) Patent No.: US 7,600,595 B2
(45) Date of Patent: Oct. 13, 2009

(54) ELECTRIC TRACTION

(75) Inventor: Warner Olan Harris, Cerritos, CA (US)

(73) Assignee: Zero Emission Systems, Inc., Dallas, TX (US)

( * ) Notice: Subject to any disclaimer, the term of this patent is extended or adjusted under 35 U.S.C. 154(b) by 424 days.

(21) Appl. No.: 11/558,786

(22) Filed: Nov. 10, 2006

(65) Prior Publication Data

US 2007/0181355 A1 Aug. 9, 2007

Related U.S. Application Data

(63) Continuation-in-part of application No. 11/374,709, filed on Mar. 14, 2006.

(60) Provisional application No. 60/774,732, filed on Feb. 21, 2006, provisional application No. 60/661,668, filed on Mar. 14, 2005.

(51) Int. Cl.
*B60K 1/00* (2006.01)
(52) U.S. Cl. ............... 180/65.31; 903/941; 903/942
(58) Field of Classification Search ............ 180/65.3, 180/65.4; 903/941, 942, 943, 944, 946, 948
See application file for complete search history.

(56) References Cited

U.S. PATENT DOCUMENTS

| | | | |
|---|---|---|---|
| 2,467,398 A | 4/1949 | Miller | |
| 2,810,293 A | 10/1957 | George et al. | |
| 2,923,171 A | 2/1960 | Jedrzykowski | |
| 2,930,242 A | 3/1960 | George | |
| 3,209,604 A | 10/1965 | Mitchell et al. | |
| 3,597,935 A | 8/1971 | Pierrat | |
| 3,599,814 A | 8/1971 | Brownfield | |
| 3,646,773 A | 3/1972 | Falk et al. | |
| 3,716,768 A | 2/1973 | Mason | |
| 3,792,327 A * | 2/1974 | Waldorf | 318/139 |
| 3,882,950 A | 5/1975 | Strohlein | |
| 4,193,271 A | 3/1980 | Honigsbaum | |
| 4,271,677 A | 6/1981 | Harr | |
| 4,280,330 A | 7/1981 | Harris et al. | |
| 4,438,342 A | 3/1984 | Kenyon | |

(Continued)

FOREIGN PATENT DOCUMENTS

EP 1 140 533 1/2003

(Continued)

OTHER PUBLICATIONS

U.S Army Public Affairs Office. "TARDEC Sponsors cross-country fuel cell truck expedition." RDECOM Magazine, Jul. 2005. p. 6. Aberdeen Proving Ground, MD.

(Continued)

*Primary Examiner*—S. Joseph Morano
*Assistant Examiner*—John D Walters
(74) *Attorney, Agent, or Firm*—Kelly K. Kordzik; Anthony V. S. England; Fish & Richardson P.C.

(57) ABSTRACT

A drive train includes an internal combustion engine ("ICE") coupled to a transmission having a power takeoff port. A transfer device couples an electric motor to the transmission via the port. The electric motor is enabled in a certain configuration to selectively power the drive train during at least certain intervals when the ICE is powered off.

64 Claims, 8 Drawing Sheets

U.S. PATENT DOCUMENTS

| | | | |
|---|---|---|---|
| 4,448,157 A | 5/1984 | Eckstein et al. | |
| 4,461,988 A | 7/1984 | Plunkett | |
| 4,470,476 A | 9/1984 | Hunt | |
| 4,588,040 A | 5/1986 | Albright, Jr. et al. | |
| 4,658,599 A | 4/1987 | Kajiwara | |
| 4,711,204 A | 12/1987 | Rusconi | |
| 4,712,636 A | 12/1987 | Ishimatsu | |
| 4,732,229 A | 3/1988 | Lucht | |
| 4,825,663 A | 5/1989 | Nijjar et al. | |
| 4,828,452 A | 5/1989 | Bolitho | |
| 4,846,327 A | 7/1989 | Mayer | |
| 4,947,657 A | 8/1990 | Kalmbach | |
| 4,976,114 A | 12/1990 | Manning | |
| RE33,687 E | 9/1991 | Greer | |
| 5,046,326 A | 9/1991 | Havemann et al. | |
| 5,048,657 A | 9/1991 | Dissett et al. | |
| 5,190,118 A | 3/1993 | Yelton | |
| 5,255,733 A | 10/1993 | King | |
| 5,267,635 A | 12/1993 | Peterson et al. | |
| 5,307,645 A | 5/1994 | Pannell | |
| 5,346,031 A | 9/1994 | Gardner | |
| 5,522,778 A | 6/1996 | Iwase et al. | |
| 5,558,588 A | 9/1996 | Schmidt | |
| 5,637,987 A | 6/1997 | Fattic | |
| 5,644,200 A | 7/1997 | Yang | |
| 5,656,921 A | 8/1997 | Farrall | |
| 5,669,842 A | 9/1997 | Schmidt | |
| 5,722,911 A | 3/1998 | Ibaraki et al. | |
| 5,755,303 A | 5/1998 | Yamamoto | |
| 5,773,904 A | 6/1998 | Schiebold et al. | |
| 5,775,449 A | 7/1998 | Moroto et al. | |
| 5,799,632 A | 9/1998 | Bennett | |
| 5,799,744 A | 9/1998 | Yamaguchi | |
| 5,801,499 A | 9/1998 | Tsuzuki et al. | |
| 5,806,617 A | 9/1998 | Yamaguchi | |
| 5,810,321 A | 9/1998 | Presson | |
| 5,815,824 A | 9/1998 | Saga et al. | |
| 5,823,282 A | 10/1998 | Yamaguchi | |
| 5,841,201 A | 11/1998 | Tabata et al. | |
| 5,842,534 A | 12/1998 | Frank | |
| 5,845,731 A | 12/1998 | Buglione | |
| 5,847,469 A | 12/1998 | Tabata et al. | |
| 5,862,497 A | 1/1999 | Yano | |
| 5,881,564 A | 3/1999 | Kishimoto | |
| 5,887,670 A | 3/1999 | Tabata | |
| 5,896,750 A | 4/1999 | Karl | |
| 5,942,879 A | 8/1999 | Ibaraki | |
| 5,951,614 A | 9/1999 | Tabata et al. | |
| 6,038,877 A | 3/2000 | Peiffer et al. | |
| 6,059,059 A | 5/2000 | Schmidt-Brucken | |
| 6,080,081 A | 6/2000 | Sauermann et al. | |
| 6,138,788 A * | 10/2000 | Bohner et al. | 180/405 |
| 6,151,891 A | 11/2000 | Bennett | |
| 6,155,364 A | 12/2000 | Nagano et al. | |
| 6,164,400 A | 12/2000 | Jankovic | |
| 6,209,672 B1 * | 4/2001 | Severinsky | 180/65.2 |
| 6,269,713 B1 * | 8/2001 | Ohke | 74/733.1 |
| 6,276,161 B1 | 8/2001 | Peiffer et al. | |
| 6,318,486 B2 | 11/2001 | Masaki | |
| 6,332,257 B1 | 12/2001 | Reed, Jr. et al. | |
| 6,340,339 B1 | 1/2002 | Tabata et al. | |
| 6,367,570 B1 | 4/2002 | Long, III et al. | |
| 6,405,818 B1 | 6/2002 | Anthony | |
| 6,419,040 B2 | 7/2002 | Kitano et al. | |
| 6,427,100 B1 | 7/2002 | Kaku | |
| 6,441,506 B2 | 8/2002 | Nakashima | |
| 6,480,767 B2 * | 11/2002 | Yamaguchi et al. | 701/22 |
| 6,488,345 B1 * | 12/2002 | Woody et al. | 303/152 |
| 6,488,609 B1 | 12/2002 | Morimoto et al. | |
| 6,519,513 B2 | 2/2003 | Nakagawa et al. | |
| 6,520,160 B2 | 2/2003 | Kojima et al. | |
| 6,557,655 B2 | 5/2003 | Ovshinsky et al. | |
| 6,558,290 B2 | 5/2003 | Phillips et al. | |
| 6,570,265 B1 | 5/2003 | Shiraishi et al. | |
| 6,616,569 B2 | 9/2003 | Hoang et al. | |
| 6,629,027 B2 | 9/2003 | Yamaguchi et al. | |
| 6,651,759 B1 | 11/2003 | Gruenwald et al. | |
| 6,658,852 B2 | 12/2003 | Frey | |
| 6,664,651 B1 | 12/2003 | Kotre et al. | |
| 6,672,415 B1 * | 1/2004 | Tabata | 180/65.2 |
| 6,687,603 B2 | 2/2004 | Wakashiro et al. | |
| 6,688,411 B2 | 2/2004 | Boggs et al. | |
| 6,692,403 B2 | 2/2004 | Charaudeau et al. | |
| 6,694,232 B2 | 2/2004 | Saito et al. | |
| 6,705,416 B1 | 3/2004 | Glonner et al. | |
| 6,712,165 B1 | 3/2004 | Okazaki | |
| 6,721,637 B2 | 4/2004 | Abe et al. | |
| 6,735,502 B2 | 5/2004 | Phillips et al. | |
| 6,740,987 B2 | 5/2004 | Kitajima et al. | |
| 6,745,117 B1 | 6/2004 | Thacher et al. | |
| 6,768,932 B2 | 7/2004 | Claypole et al. | |
| 6,781,251 B2 | 8/2004 | Takaoka et al. | |
| 6,787,932 B2 | 9/2004 | Takaoka et al. | |
| 6,796,367 B2 | 9/2004 | Blacquiere et al. | |
| 6,805,211 B2 | 10/2004 | Fujikawa | |
| 6,808,470 B2 | 10/2004 | Boll | |
| 6,840,341 B2 | 1/2005 | Fujikawa | |
| 6,851,470 B2 | 2/2005 | Laukhuf | |
| 6,857,985 B2 * | 2/2005 | Williams | 477/5 |
| 6,862,511 B1 | 3/2005 | Phillips et al. | |
| 6,867,509 B1 | 3/2005 | Takaoka et al. | |
| 6,868,927 B2 | 3/2005 | Boll | |
| 6,881,167 B2 | 4/2005 | Inada | |
| 6,892,541 B2 | 5/2005 | Suzuki | |
| 6,907,337 B2 | 6/2005 | Phillips et al. | |
| 6,915,198 B2 | 7/2005 | Phillips et al. | |
| 6,921,984 B2 | 7/2005 | Rogg | |
| 6,966,868 B2 | 11/2005 | Stork et al. | |
| 6,991,053 B2 | 1/2006 | Kuang et al. | |
| 6,994,177 B2 | 2/2006 | Ito et al. | |
| 6,994,360 B2 | 2/2006 | Kuang et al. | |
| 6,998,727 B2 | 2/2006 | Gray | |
| 7,004,273 B1 | 2/2006 | Gruenwald | |
| 7,021,409 B2 | 4/2006 | Tamor | |
| 7,035,727 B2 | 4/2006 | De La Salle et al. | |
| 7,055,337 B2 | 6/2006 | Horn | |
| 7,055,636 B2 | 6/2006 | Komiyama et al. | |
| 7,091,839 B2 | 8/2006 | Situ et al. | |
| 7,102,313 B2 | 9/2006 | Kadota | |
| 7,104,347 B2 | 9/2006 | Severinsky et al. | |
| 7,104,920 B2 * | 9/2006 | Beaty et al. | 477/5 |
| 7,107,776 B2 | 9/2006 | Ikura et al. | |
| 7,143,851 B2 | 12/2006 | Masterson | |
| 7,147,072 B2 | 12/2006 | Botti | |
| 7,223,200 B2 | 5/2007 | Kojima et al. | |
| 7,240,749 B2 | 7/2007 | Bhavsar et al. | |
| 7,273,119 B2 | 9/2007 | Tsuneyoshi et al. | |
| 7,275,610 B2 | 10/2007 | Kuang et al. | |
| 7,285,869 B2 | 10/2007 | Syed et al. | |
| 7,301,302 B2 * | 11/2007 | Yoshii | 320/104 |
| 7,306,064 B2 | 12/2007 | Imazu et al. | |
| 7,315,090 B2 | 1/2008 | Yang | |
| 7,407,026 B2 | 8/2008 | Tamor | |
| 7,469,758 B2 | 12/2008 | Iwanaka et al. | |
| 7,469,858 B2 | 12/2008 | Edelson | |
| 7,487,852 B2 | 2/2009 | Leone et al. | |
| 7,497,198 B2 | 3/2009 | Leone et al. | |
| 7,506,711 B2 | 3/2009 | Usoro | |
| 2001/0022245 A1 | 9/2001 | Rogg | |
| 2003/0062205 A1 | 4/2003 | Konrad et al. | |
| 2004/0093264 A1 | 5/2004 | Shimizu | |
| 2004/0157704 A1 | 8/2004 | Stork et al. | |
| 2004/0200648 A1 | 10/2004 | Tarasinski et al. | |
| 2004/0207205 A1 | 10/2004 | Kikuchi et al. | |

| | | |
|---|---|---|
| 2005/0060076 A1 | 3/2005 | Phillips et al. |
| 2005/0060079 A1 | 3/2005 | Phillips et al. |
| 2005/0060080 A1 | 3/2005 | Phillips et al. |
| 2005/0109550 A1 | 5/2005 | Buglione et al. |
| 2005/0113202 A1 | 5/2005 | Miller et al. |
| 2005/0211479 A1 | 9/2005 | Tamor |
| 2005/0224264 A1 | 10/2005 | Perrin |
| 2006/0108161 A1 | 5/2006 | Feliss et al. |
| 2006/0207274 A1 | 9/2006 | Harris |
| 2006/0213704 A1 * | 9/2006 | Mack .................... 180/65.2 |
| 2006/0258505 A1 | 11/2006 | Vafidis |
| 2007/0030450 A1 | 2/2007 | Liang et al. |
| 2007/0056784 A1 | 3/2007 | Joe et al. |
| 2007/0080005 A1 | 4/2007 | Joe |
| 2007/0107956 A1 | 5/2007 | Matsubara et al. |
| 2007/0107958 A1 | 5/2007 | Oliver |
| 2007/0124037 A1 | 5/2007 | Moran |
| 2007/0169970 A1 | 7/2007 | Kydd |
| 2007/0181355 A1 | 8/2007 | Harris |
| 2007/0246274 A1 | 10/2007 | Dreibholz et al. |
| 2007/0272456 A1 | 11/2007 | Shiiba |
| 2007/0278022 A1 | 12/2007 | Tanishima |
| 2008/0000700 A1 | 1/2008 | Kotani |
| 2008/0006467 A1 | 1/2008 | Morishita et al. |
| 2008/0012535 A1 | 1/2008 | Takatsuji et al. |
| 2008/0029319 A1 | 2/2008 | Fleckner et al. |
| 2008/0029320 A1 | 2/2008 | Fleckner et al. |
| 2008/0076616 A1 | 3/2008 | Kidokoro et al. |
| 2008/0220933 A1 | 9/2008 | Maeda |
| 2008/0236912 A1 | 10/2008 | Ueoka et al. |
| 2009/0018716 A1 | 1/2009 | Ambrosio |
| 2009/0024267 A1 | 1/2009 | Kawai |
| 2009/0030568 A1 | 1/2009 | Amano |
| 2009/0107744 A1 | 4/2009 | Foersterling et al. |

FOREIGN PATENT DOCUMENTS

| | | |
|---|---|---|
| EP | 114053381 | 1/2003 |
| EP | 1297982 | 4/2003 |
| EP | 0 784 743 | 5/2003 |
| EP | 0784743 | 5/2003 |
| JP | 07-195955 | 8/1995 |
| JP | 11-146502 | 5/1999 |
| JP | 2004-236609 | 8/2004 |
| JP | 2004-318370 | 11/2004 |
| WO | 2004062957 | 7/2004 |
| WO | 2005003600 | 1/2005 |
| WO | WO2006038968 | 4/2006 |
| WO | 2007030069 | 3/2007 |
| WO | WO 2007/097819 | 8/2007 |

OTHER PUBLICATIONS

Southwest Research Institute. "Fuel cell-assisted truck completes cross-country trek." http://www.swri.org/9what/releases/2005/FueiCell.htm, May 26, 2005. SwRI, San Antonio, TX.

Brodrick et al. "Demonstration of a Proton Exchange Membrane Fuel Cell as an Auxiliary Power Source for Heavy Trucks." SAE Transactions, 2000, vol. 109, pp. 783-788. NY, NY.

International Search Report dated Mar. 20, 2008: Application No. PCT/US06/60833, 10 pgs.

Southwest Research Institute, "Fuel cell-assisted truck completes cross-country trek," May 26, 2005, SwRI, San Antonio, Texas (1 page). [Online], [retrieved on Mar. 6, 2006]. Retrieved from the Internet: <URL:http://www.swri.org/9what/releases/2005/FuelCell.htm>.

U.S. Army Public Affairs Office. "TARDEC Sponsors cross-country fuel cell truck expedition." RDECOM Magazine, Jul. 2005, p. 6. Aberdeen Proving Ground, Maryland.

Brodrick et al. "Demonstration of a Proton Exchange Membrande Fuel Cell as an Auxiliary Power Source for Heavy Trucks." SAE Transactions, 2000, vol. 109, pp. 783-788. New York, NY.

"Power Take-Offs"; http://www.gears-manufacturers.com/power-take-offs.html; 3 pages.

International Search Report and Written Opinion Dated Nov. 5, 2008, Application No. PCT/US2008/072672, 6 pages.

International Preliminary Report on Patentability dated Mar. 9, 2009, Application No. PCT/US06/60833, 12 pages.

* cited by examiner

ELECTRIC TRACTION

RELATED APPLICATIONS

This is a nonprovisional application claiming the benefit of the priority date of Warner Olan Harris, U.S. provisional application No. 60/774,732, filed Feb. 21, 2006, entitled "Hybrid electric traction power system for moving class 7&8 tractors by means of a drive motor attached to the power takeoff (PTO) of the tractor's transmission PTO connection point," which is hereby incorporated herein by reference.

This is also a continuation-in-part application claiming the benefit of the priority date of Warner Olan Harris, U.S. nonprovisional patent application Ser. No. 11/374,709, filed Mar. 14, 2006, entitled "Fuel cell-driven auxiliary system, and method therefor," which claims the benefit of the priority date of Warner Olan Harris, U.S. provisional patent application No. 60/661,668 filed Mar. 14, 2005, which are hereby incorporated herein by reference.

BACKGROUND

1. Field of the Invention

The present invention concerns a drive train including an internal combustion engine ("ICE") coupled to a transmission having an opening, and, more particularly, concerns an electric motor and transfer device coupling the electric motor to the transmission via the opening, enabling the electric motor to selectively power the drive train during at least certain intervals when the ICE is powered off.

2. Description of Related Art

In certain circumstances, trucks powered by ICE's idle for long intervals and sporadically move. This may occur, for example, while waiting at ports and other staging areas. Moreover, it may occur for both picking up and dropping off loads and, likewise, for both entering and exiting a staging area. This use of ICE's is in some ways undesirable. The fuel usage and emissions of heat, noise and exhaust in these situations are very large relative to the distances that loads are moved. However, an economically feasible alternative has not been developed, particularly for loads handled by heavy duty, tractor-trailer trucks.

It is, of course, known to use an electric motor in a relatively small hybrid electric vehicle ("HEV") to assist an ICE or even briefly preempt the use of an ICE for traction, i.e., moving the vehicle. There are, however, numerous obstacles to the use of electric motors, particularly for applications such as described above for trucks. For example, the loads for trucks in staging areas are potentially much greater than what is encountered by conventional HEV's.

While it does not address all these matters, U.S. Pat. No. 5,558,588 ("Schmidt") illustrates how an obstacle regarding rotational load transfer has been addressed in the context of HEV's. As Schmidt illustrates, a hybrid transmission for an HEV includes an electric traction motor and planetary gear set within the hybrid transmission housing for transferring rotation from the electric motor to the transmission output shaft, which may also be driven by the ICE. Even with regard to merely this one obstacle, the teachings of Schmidt may be of limited use for the problem described herein above and similar problems. That is, in order to apply the Schmidt arrangement for powering a conventional ICE vehicle via an electric motor, the vehicle's conventional transmission is replaced with the hybrid transmission. Since there are a multitude of trucks currently in service, this approach does not provide a practical transition to the use of electric motors for this service.

In another prior art arrangement that addresses sporadic and relatively slow movement, U.S. Pat. No. 6,269,713 ("Ohke") discloses the addition of a conventional power takeoff ("PTO") device to a passenger vehicle in order to take power out of the vehicle's ICE for "inching." Ohke further discloses the addition of a hydraulic pump, hydraulic motor and secondary transmission coupled to the vehicle's conventional transmission output shaft in order to return power from the PTO for moving the vehicle in the inching mode. While this arrangement does not require replacement of the vehicle's original transmission, it has other disadvantages, not the least of which is that the ICE operates full-time in order to supply power to the PTO for inching. Also, power losses through the hydraulic pump, hydraulic motor and secondary transmission are substantial.

Referring to prior art FIG. 1A, details are shown of a conventional PTO arrangement such as may apply to the Ohke patent. A transmission 122 has a case 127 defining a port 124, which is covered by a removable access plate 121. Internal combustion engine ("ICE") crankshaft 110 connects to transmission input shaft 125 via clutch 120. In other words, ICE is coupled via crankshaft 110 to a drive train that includes clutch 120 coupled to input 125 of transmission 122.

Transmission 122 has a transfer gear 130 coupled to input shaft 125. As shown in prior art FIG. 1B, a conventional power takeoff ("PTO") 140, which is a type of transfer device, has a case 142 defining an opening that matches port 124. Case 142 is adapted for bolting to transmission case 127 so as to align case 142 with port 124 so that gear 141 of PTO 140 engages gear 130 of transmission 122, as is conventional. This arrangement conventionally enables takeoff of power from ICE crank shaft 110 via PTO shaft 143.

U.S. Pat. No. 2,923,171 ("Jedrzykowski") also discloses the use of a PTO for very slow speed operation. In the teaching of Jedrzykowski, the application is for a tractor and the slow speed operation is referred to as "creeping." According to Jedrzykowski, the tractor's clutch is disengaged for the creeping mode of operation and the PTO is used to put power into its transmission shaft from an externally mounted electric motor. The electric motor is energized by a generator that is, in turn, driven by the tractor's ICE. As in the teachings of Ohke, Jedrzykowski's disclosure only addresses a limited set of obstacles with regard to the present problem and also has the disadvantage that operation of the ICE ultimately supplies the power for creeping, so that the ICE must operate full time.

Thus, it should be appreciated that a need exists for a way to reduce fuel usage and emissions of heat, noise and exhaust in connection with the use of ICE's for idling or for moving short distances or at relatively slow speeds. The need is especially acute for hauling large loads by heavy duty, tractor-trailer trucks, particularly in situations such as in heavy traffic or around staging areas, where movement may be sporadic or relatively slow.

SUMMARY OF THE INVENTION

The present invention addresses the foregoing needs. According to one form of the invention, a system includes a drive train with an internal combustion engine ("ICE") coupled to a transmission having a power takeoff port. A transfer device couples an electric motor to the transmission via the port. The electric motor is enabled in a certain configuration of the system to selectively power the drive train during at least certain intervals when the ICE is powered off.

In another aspect, the system includes a source device for supplying power to the electric motor. The source device may include a fuel cell. The source device may include a battery.

The source device may include a battery and a fuel cell configured to charge the battery.

In another aspect, the system is configured to enable charging of the battery by the ICE when the ICE is powered on.

According to one form of the invention, in an electric traction system for a vehicle having an internal combustion engine ("ICE") coupled to a drive train, the drive train includes a clutch coupled to an input of a transmission, and the system includes an electric motor and a transfer device for transferring rotation of the motor to the transmission input for moving the vehicle. The system also includes a source device electrically coupled to the motor to supply power for the moving of the vehicle during at least certain intervals when the ICE is powered off. The system also includes controls configured to enable the moving to occur selectively.

In another aspect, the transmission has a case defining a port for accessing the transmission input and the transfer device has a case fixed to the transmission case such that the transfer device engages the transmission input for transferring the rotation of the electric motor.

In another aspect, the system includes a motor controller, wherein the source device is electrically coupled to the motor via the motor controller.

In another aspect, the source device includes a battery electrically coupled to the motor controller to supply electrical power for the motor, wherein the electrical coupling of the fuel cell to the motor is via the battery so that the fuel cell is operable to recharge the battery.

In another aspect, the controls are electrically coupled to, and operable with, the motor controller to energize the electric motor responsive to a demand signal.

In another aspect, the demand signal is a variable demand signal and the energizing of the electric motor includes variable energizing such that speed of the vehicle is modulated responsive to the variable demand signal.

In another aspect, the controls include a throttle and a variable impedance device. The energizing of the electric motor may include variable energizing. Thus, the demand signal may include a variable impedance signal from the variable impedance device, where the impedance is varied responsive to the throttle.

In another aspect, the controls are electrically coupled to, and operable with, the motor controller to deenergize the electric motor responsive to a shutdown signal, wherein the shutdown signal indicates operation of the ICE or a precursor to operation of the ICE. The shutdown signal may include a signal for starting the ICE. The shutdown signal may include a clutch position signal. The shutdown signal may include an ICE rotation signal. The shutdown signal may include an ICE ignition signal.

In another aspect, the controls include an actuator configured to automatically move the clutch to a position in which the ICE is disengaged from the transmission input responsive to a signal. The signal to automatically move the clutch may indicate initializing of an operating mode in which movement of the vehicle is powered by the electrical motor.

In another aspect, the system is configured for enabling charging of the battery by the ICE. The configuration enabling charging of the battery by the ICE may include the transmission being engaged to the ICE via the clutch for mechanically transferring power from the ICE to the motor via the clutch, so that the motor is operable as a generator.

In another aspect, the vehicle includes an air compressor driven by the ICE for supplying air to a reservoir for a braking subsystem of the vehicle. Accordingly, the system comprises an auxiliary air compressor for supplying air to the reservoir during at least certain times when the ICE is powered off. The system also includes an auxiliary air electric motor for driving the auxiliary air compressor and an air pressure switch coupled to the reservoir for turning on the auxiliary air electric motor responsive to low air pressure.

In another aspect, the vehicle includes a hydraulic fluid pump driven by the ICE for supplying fluid to a steering subsystem of the vehicle. Accordingly, the system comprises an auxiliary hydraulic fluid pump for supplying fluid to the power steering subsystem during at least certain times when the ICE is powered off. The system also includes an auxiliary hydraulic fluid electric motor for driving the auxiliary hydraulic fluid pump and at least one limit switch coupled to the steering subsystem for turning on the auxiliary hydraulic fluid electric motor responsive to a position of at least one component of the steering subsystem. The at least one component of the steering subsystem may include a steering arm.

Other variations, objects, advantages, and forms of the invention will become apparent upon reading the following detailed description and upon reference to the accompanying drawings. For example, in one form of the invention features described herein are performed as in novel process steps, which may include processes for controlling a system such as described herein. In another form of the invention, a computer system includes a processor and a storage device connected to the processor. The storage device has stored thereon a program for controlling the processor. The processor is operative with the program to execute the program for performing a method, in whole or in part, which may include processes for controlling a system such as described herein. In another form of the invention, a computer program product is stored on a tangible, computer readable medium. The computer program product has instructions for executing by a computer system. When executed by the computer the instructions cause the computer to implement processes for controlling a system such as described herein.

BRIEF DESCRIPTION OF THE DRAWINGS

The foregoing and other objects, aspects and advantages will be better understood from the following detailed description of a preferred embodiment(s) of the invention with reference to the accompanying drawings. The same reference numbers are used throughout the FIGS. reference like components and features. In the drawings.

DETAILED DESCRIPTION OF PREFERRED EMBODIMENTS OF THE INVENTION

In the following detailed description of the preferred embodiments, reference is made to the accompanying drawings illustrating embodiments in which the invention may be practiced. It should be understood that other embodiments may be utilized and changes may be made without departing from the scope of the present invention. The drawings and detailed description are not intended to limit the invention to the particular form disclosed. On the contrary, the intention is to cover all modifications, equivalents and alternatives falling within the spirit and scope of the present invention as defined by the appended claims. Headings herein are not intended to limit the subject matter in any way.

Overview

According to an embodiment of the present invention, an electric traction system includes an electric motor (referred to herein also as an electric traction motor) to drive a vehicle's conventional or original equipment transmission for traction when the vehicle is moving slowly, frequently idling, or when noise or pollution is a concern. Otherwise, the main traction engine, an ICE, may be started and used in a normal manner. During normal highway or street operation of the vehicle, the electric traction motor may be operated in a second mode as a generator, which is powered by the main traction engine via the OEM transmission, in order to recharge batteries of the electric traction system. The system includes a hydrogen fuel cell that also generates electricity and thus reduces the size of batteries required to operate the system's electric traction motor.

A preferred application of the invention is for heavy duty trucks traveling at speeds below approximately 20 MPH. However, in various embodiments, the invention may be applied at higher speeds and for different vehicles. For example, in one application, trucks may be driven at least partly by an electric traction motor even at speeds above 20 MPH when near communities where noise or emissions are an issue, such as in heavy traffic and in densely populated communities near ports, for example, where smog and noise may be particularly problematic. Other reasons may exist for driving a truck or other vehicle at least partly by an electric traction motor at speeds above 20 MPH according to an embodiment of the invention.

Figure 1:
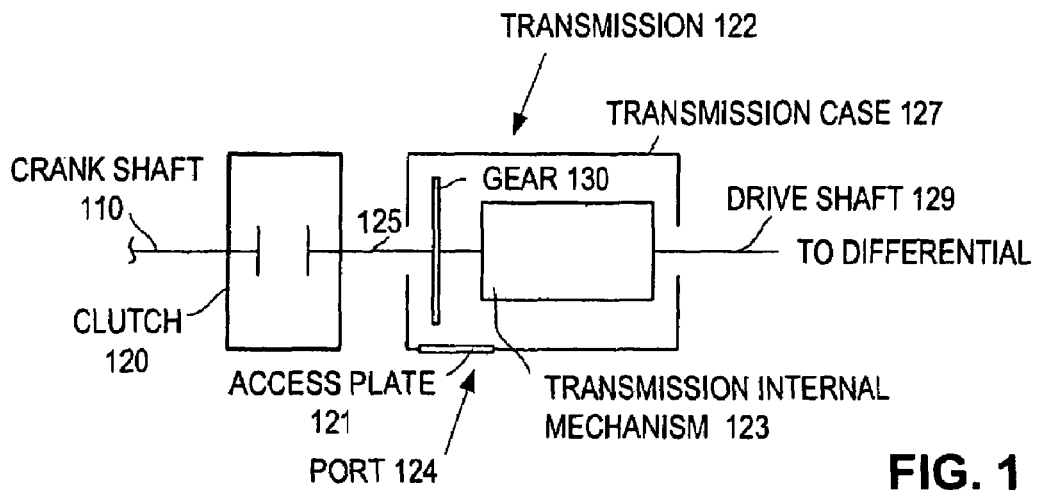
FIG. 1 illustrates aspects of a prior art drive train.
Figure 1B:
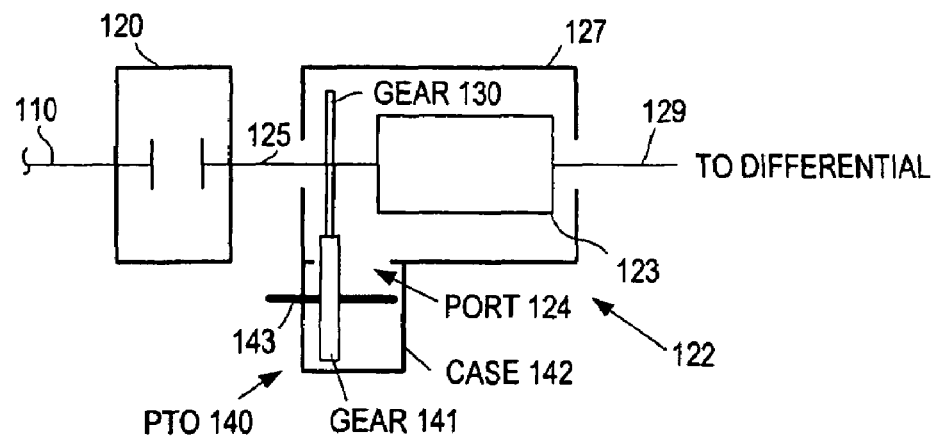
FIG. 1B illustrates aspects of a prior art drive train with a PTO.
Figure 2:
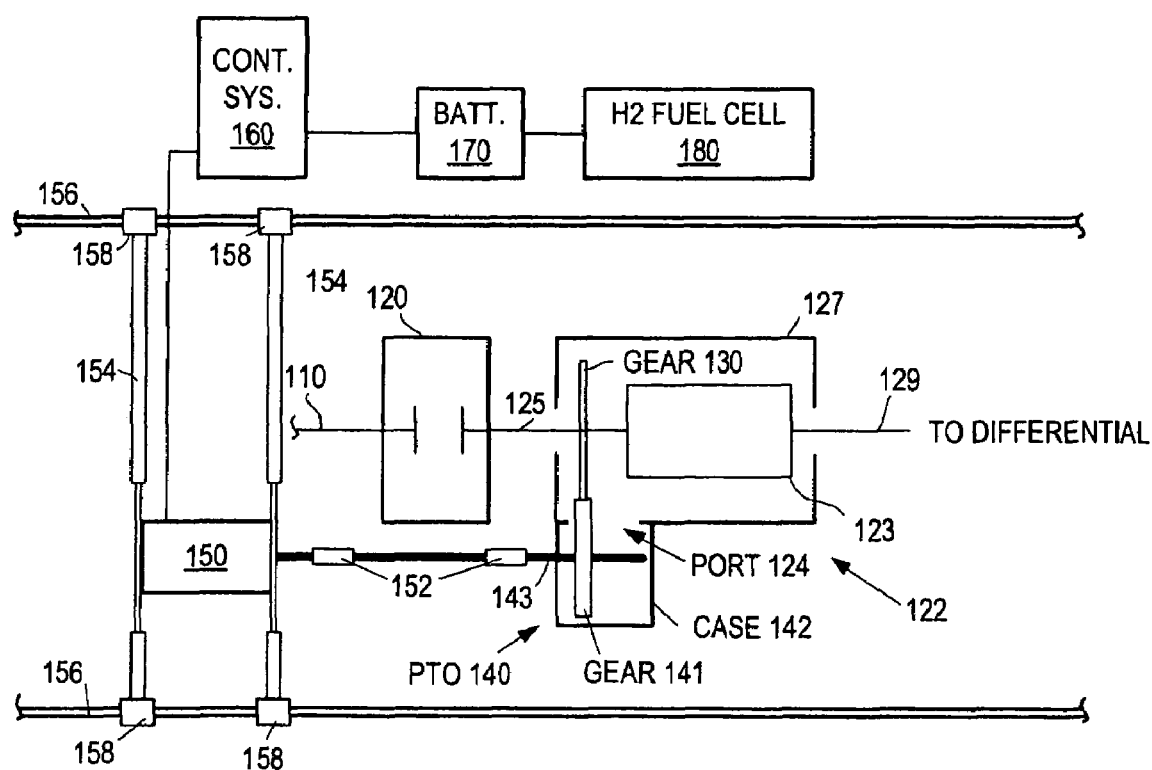
FIG. 2 illustrates certain components and certain mounting and engagement aspects of an electric traction system for a vehicle, according to an embodiment of the present invention.

Referring now to FIG. 2, according to the present invention, electric traction motor 150 is shown mounted on frame rails 156 of a truck. The arrangement of FIG. 2 is structurally different than a conventional HEV arrangement, in which a hybrid transmission houses an electric motor and planetary gear set that couples the electric motor shaft to the transmission output shaft for transferring rotation from the electric traction motor to the transmission output shaft, which is also driven by the ICE (not shown in FIG. 2). Electric traction motor 150 in FIG. 2 is external to transmission case 127 and is too heavy and large to be reliably supported by case 127, since transmission case 127 cannot reliably withstand this much cantilevered weight. In the illustrated embodiment of the invention, brackets 154 are mounted to frame rail 156 of the truck by pinch clamps 158. In turn, motor 150 is bolted to brackets 154 with sufficient clearance to permit the conventional drive train, which includes transmission 122, to freely move relative to frame rail 156 and other components.

Motor 150 is controlled by control system 160 and supplied by battery 170, which is a type of source device. Battery 170 is, in turn, supplied by hydrogen fuel cell 180, which is another type of source device. Motor 150 is provided to power transmission output shaft 129 via gear 141 of PTO 140 that engages gear 130 on an input shaft 125 of transmission 122. That is, gear 141 is for transferring rotation from electric traction motor 150 to drive shaft 129. PTO 140 houses gear 141 in a case 142 independent of, and removably bolted to, transmission case 127, such that gear 141 is aligned to engage gear 130 through port 124 of transmission case 127.

According to the illustrated embodiment, electric traction motor 150 is preferably for powering the truck in lieu of the truck's ICE, i.e., with the ICE shut off. Thus, in order for electric traction motor 150 to drive transmission input shaft 125 without turning the ICE, which is connected to crank shaft 110, it is desirable in at least some operational modes to disengage crank shaft 110 from input shaft 125. Accordingly, a shutdown device (not shown in FIG. 2) is provided that includes control logic (not shown in FIG. 2) to deenergize electric traction motor 150 responsive to crank shaft 110 engaging transmission input shaft 125, [CHECK THIS] as will be described further herein below. A mechanical or electromechanical device (not shown in FIG. 2) is also included to hold clutch 120 in a position in which shaft 110 is disengaged from shaft 125, thereby satisfying the logic.

Block Diagrams

Figure 3A:
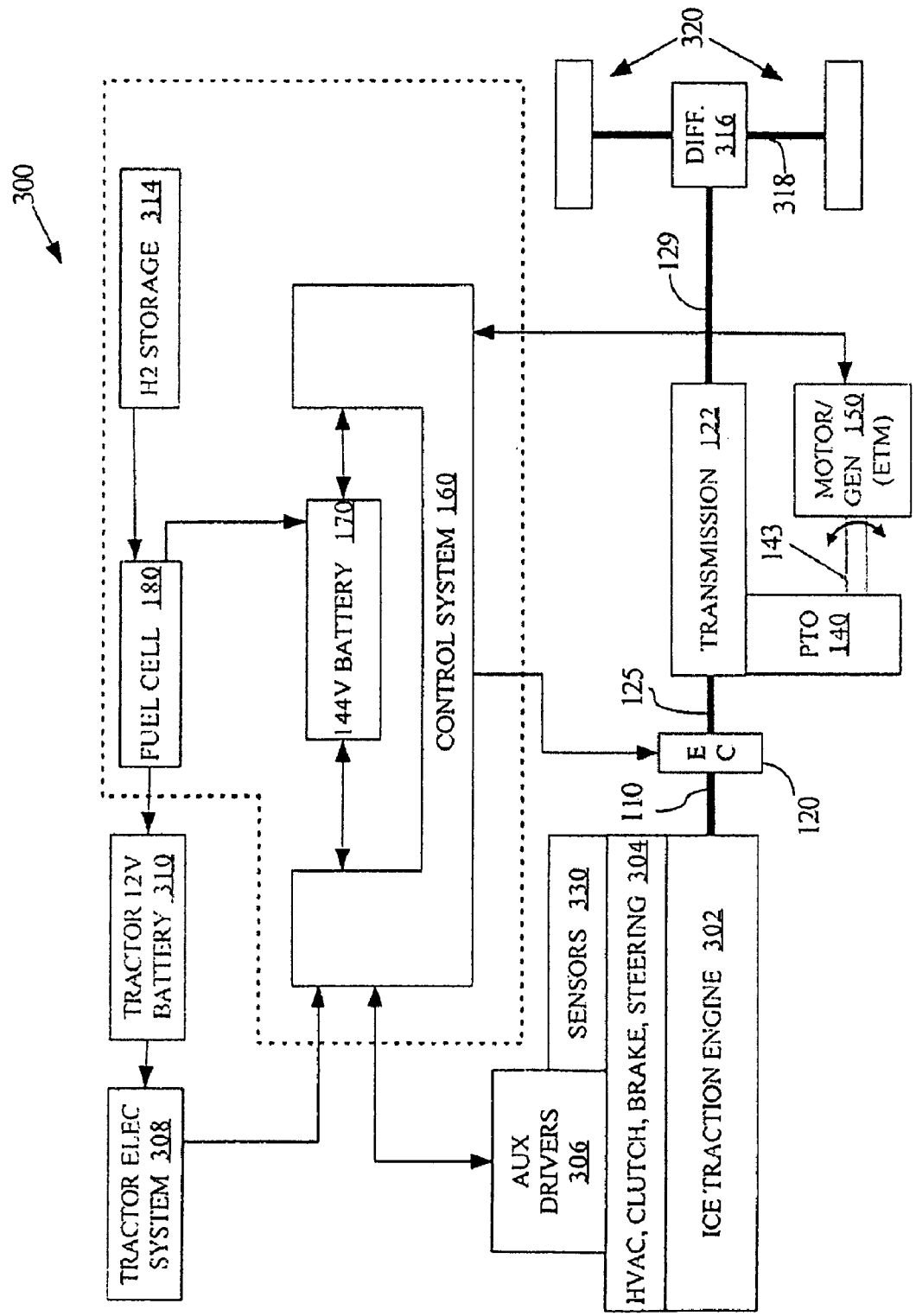
FIGS. 3A and 3B are block diagrams illustrating additional aspects of an electric traction system for a vehicle, according to an embodiment of the present invention.

Referring now to FIG. 3A, a block diagram is shown of an electric traction system for a vehicle 300, according to an embodiment of the present invention. Vehicle 300 has a drive train, which includes a conventional arrangement of traction ICE 302 coupled to crankshaft 110, clutch 120, transmission input shaft 125, transmission 122, transmission output shaft 129 and differential 316. Differential 316 translates rotation of crankshaft 110 to axles 318 and, in turn, wheels 320. Vehicle 300 also has a conventional 12VDC battery 310 for supplying conventional electrical system 308 for ignition, lights, etc.

Vehicle 300 includes electric traction motor (ETM) 150 for driving transmission 122 via PTO 140, as previously described. ETM 150 drives PTO 140 with shaft 143. ETM 150 is directly powered by an AC output of a motor controller (not shown in FIG. 3A) of control system 160, which is powered by 144 VDC batteries 170, which are, in turn, recharged by hydrogen fuel cell 180. Hydrogen fuel cell 180 is supplied by a canister 314 of compressed hydrogen. Besides charging batteries 170 to supply power for motor 150, fuel cell 180 also charges conventional tractor system 12 VDC battery 310.

In the illustrated embodiment of the invention, electric motor 150 is an alternating current type, so that it is operable in reverse to generate electricity when engine 302 is running and clutch 120 engages crankshaft 110 to transmission input shaft 125. When operating in this generating mode, (ETM) 150 may charges batteries 170 via control system 160.

The horsepower rating of motor 150 may vary from one embodiment of the invention to the next, depending on the load that needs to be serviced and on the required speed and acceleration. A fully loaded heavy duty, tractor-trailer truck may weigh around 80,000 pounds. (Conventional electric vehicles of around 1800 pounds require an electric motor of about 50 HP to achieve and maintain 80 MPH on electric power only.) In one embodiment of the present invention, electric motor 150 is of the direct current type, weighing about 180 pounds, and is rated 40 continuous HP and 80 HP for up to two minutes. In another embodiment, electric motor 150 is an alternating current motor of at least somewhat similar rating and weight. Of course, the HP rating and corresponding rate depend upon the vehicle and load.

The KWH capacity of batteries 170 may vary from one embodiment to the next, as may KW capacity of fuel cell 180 and storage capacity of canister 314. In one embodiment, batteries 170 have 14.4 KWH capacity, fuel cell 180 has 15 KW capacity, and canister 314 has 1 KG of hydrogen storage capacity at 300 psi.

Figure 3B:
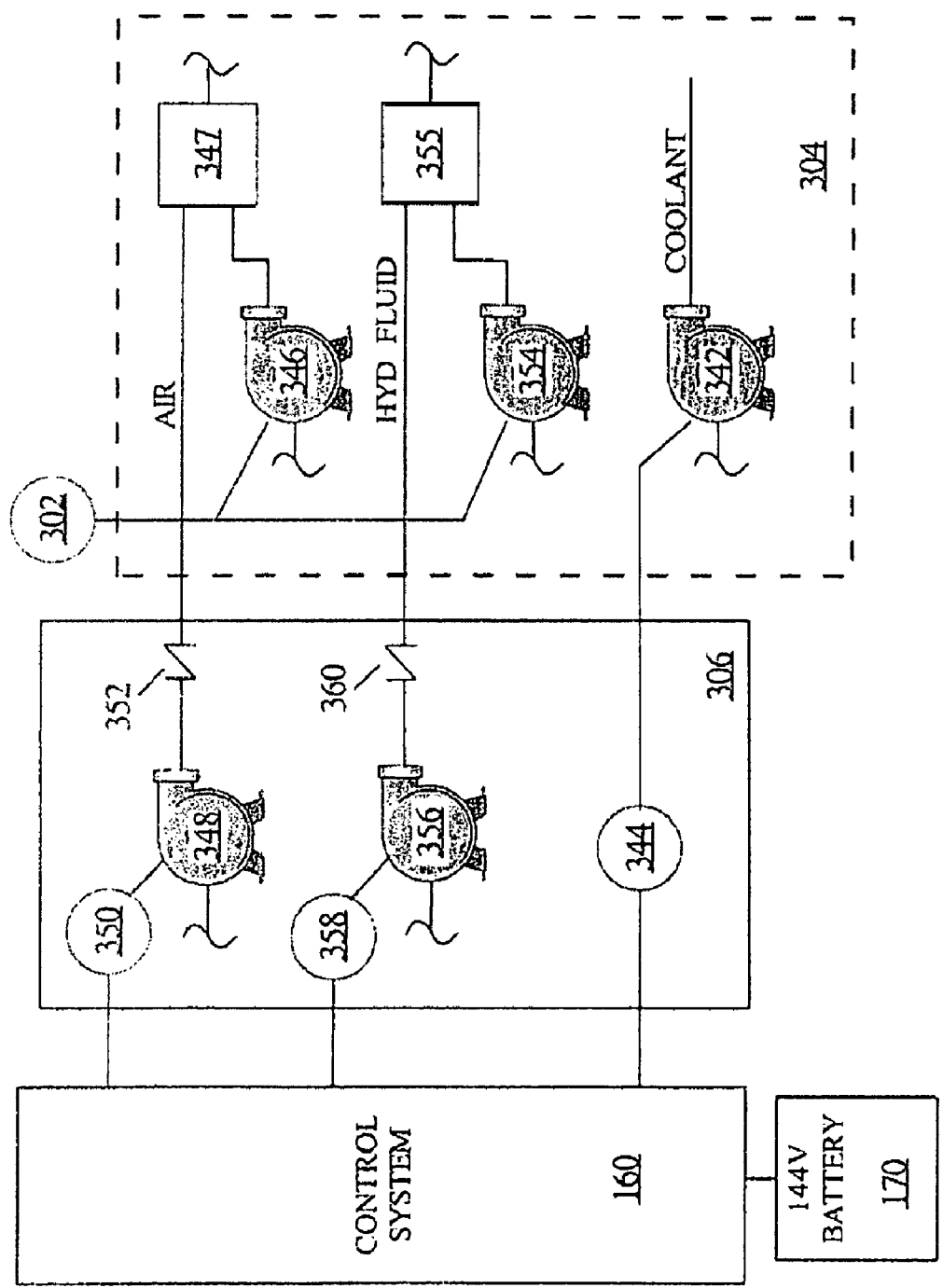

Referring now to FIG. 3B along with FIG. 3A, vehicle 300 also includes subsystem 304 that includes air conditioning, clutch, braking and steering subsystems. Refrigerant for cooling, i.e., air conditioning, of subsystem 304 is compressed by compressor 342 driven by ICE 302, as is conventional. The braking subsystem of subsystem 304 is controlled by air that is compressed by an air compressor 346 driven by ICE 302 and stored in reservoir 347, as is conventional for heavy duty trucks. The steering subsystem of subsystem 304 is controlled by a hydraulic actuator (not shown) supplied from reservoir 355 forced by hydraulic pump 354 driven by main ICE 302, as is also conventional.

In addition to the above described conventional arrangement for air conditioning, braking and steering subsystem 304, the illustrated embodiment of the present invention includes auxiliary drivers 306 controlled by control system 160 and supplied by batteries 170 for operation of air conditioning, clutch, braking and steering when ICE 302 is not running. In this electrical mode of operation, air conditioning compressor 342 is directly driven by an auxiliary electric motor 344 under control of control system 160, as described in the above referenced U.S. patent application Ser. No. 11/374,709. Also auxiliary drivers 306 include an auxiliary air compressor 348 coupled to air reservoir 347 by a check valve 352, which prevents back flow, and driven by auxiliary electric motor 350 to provide compressed air in the electrical mode of operation under control of control system 160. Drivers 306 also include an auxiliary hydraulic fluid pump 356 coupled to hydraulic fluid reservoir 355 by a check valve 360, which prevents back flow, and driven by auxiliary electric motor 358, so that pump 356 provides motive fluid for braking during electrical operation of vehicle 300 under control of control system 160.

Control System

Figure 4:
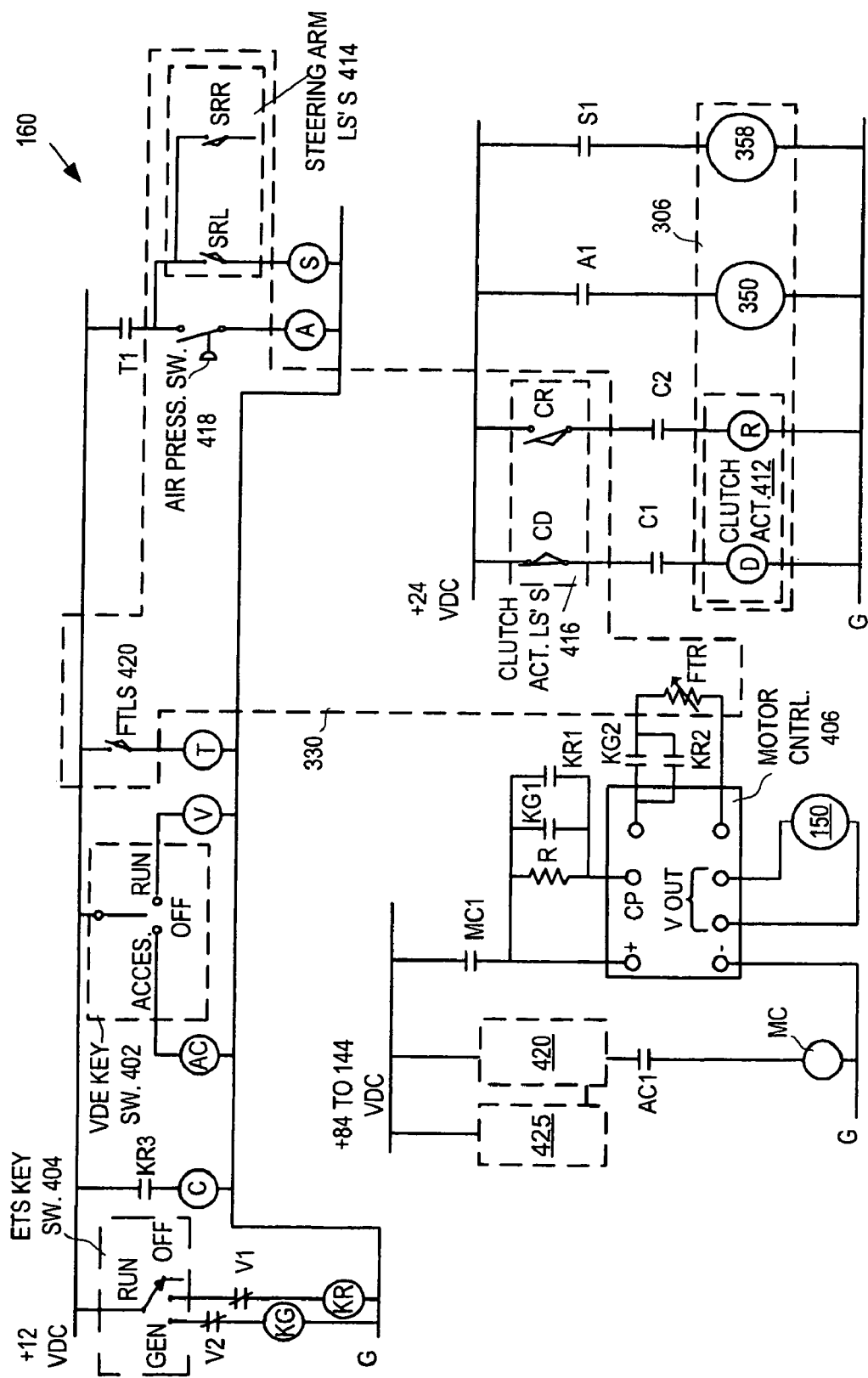
FIG. 4 is an electrical schematic diagram illustrating certain control aspects of the electric traction system of FIG. 3A, according to an embodiment of the present invention.

Referring now to FIG. 4 along with FIGS. 3A and 3B, a schematic diagram is shown illustrating aspects of control system 160 for enabling electric traction motor 150 operation of a vehicle, according to an embodiment of the present invention. System 160 includes a motor controller 406 for providing voltage to control the speed of motor 150. In one embodiment of the invention, motor controller 406 is a Cutler PMC1238. In another embodiment of the invention, motor controller 406 is a Cutler PMC1231C. More specifically, motor controller 406 outputs a voltage to control electric traction motor 150 speed responsive to a demand signal. In the illustrated control system 160, a sensor FTR is mechanically, electrically or optically coupled to a foot throttle (not shown) of the vehicle in such a manner that the resistance or impedance of FTR varies responsive the driver's positioning of the foot throttle, thereby providing a variable demand signal responsive to which the output voltage of motor 406 varies, thereby varying the voltage to motor 150 such that speed of the vehicle is smoothly modulated responsive to the variable demand signal. Varying the voltage may include varying any of, or any combination of, frequency, voltage level, or voltage pulse widths. (The foot throttle is a conventional, well known, means for controlling rotational speed of an ICE and the resulting speed of a vehicle, such as that of the vehicle controlled by system 160.)

As previously mentioned, auxiliary electric motor 350 drives an auxiliary air compressor 348 to pressurize air for operating a braking system of the vehicle, and auxiliary electric motor 358 drives an auxiliary pump 356 to pressurize hydraulic fluid for operating a power steering system of vehicle 300 when the vehicle is operating via electric traction motor 150. As described herein below, system 160 also includes various controls providing logical interlock functions, which receive signals from sensors 330, in order to ensure safe operation of vehicle 300, including electric traction motor 150, auxiliary drivers 306 and HVAC, clutch, braking and steering components of system 304.

VDE Key Switch

The following describes conventional operation of the vehicle in relation to switch 402, which is part of electrical system 308. Wired into the conventional 12 VDC electrical system of vehicle 300, system 160 has a conventional vehicle diesel engine key switch 402, which has a number of different positions, three of which are explicitly shown in FIG. 4, i.e., positions "run," "off" and "accessory." A driver conventionally inserts a key into switch 402, where switch 402 is initially oriented in the "off" position." In order to start the vehicle, the driver then turns the key to the right to a "start" position (not shown in FIG. 4) in order to energize a starter motor that cranks vehicle diesel engine 302. Then, once engine 302 is sustaining its operation by internal combustion, the driver releases the key in switch 402, which spring-returns to the "run" position shown in FIG. 4, a position that is conventionally between the "off" position and the "start" position and in which the switch will stay if undisturbed, i.e., a position having no spring return feature. In order to stop vehicle diesel engine 302, the driver may turn the key in switch 402 back to the left to the "off" position, where switch 402 will stay if undisturbed. Switch 402 also has an "accessory" position, as shown in FIG. 4, which is conventionally to the left of the "off" position, for turning on accessories such as a radio. Conventionally, if the driver turns the key to the "accessory" position switch 402 will stay in this position if undisturbed.

VDE Key Switch Logically Interlocked to Electric Traction Motor Controller

Returning now to a description of an embodiment of the present invention, according to system 160, coils of relays AC and V are wired to the accessory and "run" positions of switch 402, respectively, such that when switch 402 is in the "accessory" position the coil of relay AC is energized and when switch 402 is in the "run" position the coil of relay V is energized via 12 VDC, which is conventionally supplied by 12 VDC battery 310.

System 160 also includes an auxiliary battery 170 that supplies a first auxiliary voltage for an electric traction system, including electric traction motor/generator 150, the supplied voltage 144 VDC being shown in FIG. 4. (Although referred to as "144 VDC" it should be understood that the voltage supplied by battery 170 may vary and that control system 160 may operate properly within a supply voltage range. In one embodiment of the invention, controller 406 will operate properly with supply voltage as low as 84 VDC, for example.) An electronic traction system key switch 404 has a "run" position wired to the 12 VDC supply and in series with a normally closed contact V1 of relay V mentioned herein above and relay coil KR, as shown, such that when switch 404 is in the "run" position, the "run" contacts of switch 404 are made. Thus, if relay V is de-energized so that contacts V1 are made, relay coil KR is energized via the 12 VDC supply. Thus, it should be understood that relay V provides an interlock such that if vehicle diesel engine switch 402 is in the "run" position, relay coil KR is prevented from being energized. (Being deenergized is also referred to herein as being "dropped out.") But with vehicle diesel engine 302 switch 402 not in the "run" position, relay V is deenergized so that if electronic traction system switch 404 is in the "run" position, relay coil KR will be energized (also referred to herein as being "picked up").

System 160 also includes a relay coil MC wired in the 144 VDC supply in series with normally open contacts AC1 of the previously mentioned AC relay. Thus, relay AC provides another interlock. That is, if the vehicle diesel engine 302 switch 402 is in the "accessory" position, relay coil AC is picked up, which makes contacts AC1, thereby picking up relay MC. But if switch 402 is not in the "accessory" position, relay coil AC is dropped out, which breaks contacts AC1, thereby dropping out relay MC.

Normally open contacts MC1 of relay MC are wired to connect (i.e., "make") 144 VDC to main terminal + of controller 406, as shown. Likewise, the parallel combination of normally open contacts KR1 and KG1 of relays KR and KG are wired in series with contacts MC1 to make 144 VDC to a control power terminal CP of controller 406 and the parallel combination of normally open contacts KR2 and KG2 of relays KR and KG are connected in series with variable resistor FTR and input control terminals of controller 406, as shown.

Thus, relays AC, V, KR, KG and MC cooperate to provide control logic as further described below such that for operation of motor controller 406 vehicle diesel engine switch 402 must not be in the "run" position, but instead must be in the "accessory" position, while electric traction switch 404 must be in the "run" position. That is, in order to energize main terminals + and − of controller 406, which is, of course, required in order to control the speed of electric traction motor 150 by FTR via foot throttle, contacts MC1 must make. In order to make contacts MC1, coil MC must pick up, of course. In order to do this, vehicle diesel engine 302 switch 402 must be in the "accessory" position, which picks up coil AC, making contacts AC1 and picking up coil MC.

Also, additional shutdown devices 420 are provided in series with contacts AC1 and coil MC. These devices 420 may prevent picking up MC, thus preventing motor 150 from running, or may interrupt the path for picking up and holding MC, thereby shutting down motor 150 once it is running. Shutdown devices 420 may operate responsive to additional sensors 330 that generate shutdown signals indicating operation of the ICE or a precursor to operation of the ICE, such as a signal for starting the ICE, a clutch position signal, an ICE rotation signal, an ICE ignition signal. However, some or all shutdown devices 420 may be overridden by override devices 425 for different modes of operation, such as for operating electric motor 150 as a generator driven by ICE 302 via clutch 120, so that the overridden shutdown devices 420 will not trip out motor 150.

Energizing main terminals + and − of controller 406 supplies main power to controller 406, but controller 406 also requires control power to terminal CP. With contacts MC1 made, the 144 VDC supply is coupled to terminal CP via a 1000 ohm, 20 watt resistor R and this precharges internal controls of controller 406 coupled to terminal CP. This precharging is helpful for providing a quick response by controller 406 to action of variable resistor FTR, but does not provide enough current to fully operate controller 406.

In order for controller 406 to fully operate, contacts KR1 or KG1 and KR2 or KG2 must make to supply full power to controller 406, which requires relay coil KR or relay coil KG to pick up, of course. In order to do this, vehicle diesel engine switch 402 must not be in the "run" position, thereby ensuring that relay V remains dropped out and contacts V1 and V2 are made. Likewise, electric traction switch 404 must be in the "run" position, which picks up relay coil KR via the made contacts V1, or else in the "generate" position, which picks up relay coil KG via the made contacts V2.

The "generate" position of switch 404 is provided for enabling charging of battery 170 by ICE 302. That is, in an electric traction system "generate" operating configuration, charging of battery 170 by ICE 302 is enabled, which includes transmission 122 being engaged to ICE 302 via clutch 120 for mechanically transferring power from ICE 302 to motor/generator 150 via clutch 120, so that motor/generator 150 is operable as a generator.

Controls Relating to Operation of Clutch

In addition to the above described controls, system 160 has controls for engaging and disengaging the main vehicle diesel engine 302 clutch 120 when in the electric traction system mode of operating.

Regarding controls relating to operation of clutch 120, system 160 includes a clutch actuator 412 mechanically linked to clutch 120, as will be explained further in connection with FIG. 5 herein below. Actuator 412 has a clutch pedal depress coil D and a clutch pedal release coil R. Energizing the depress coil D causes actuator 412 to extend, thereby driving linkage coupled to a conventional clutch pedal of the vehicle toward a depressed-pedal position in which crank shaft 110 is disengaged from transmission input shaft 125. Conversely, energizing the release coil R causes actuator 412 to retract, thereby driving the clutch pedal toward a released-pedal position in which clutch 120 engages crank shaft 110 to transmission input shaft 125. Associated with actuator 412 are limit switches 416 CD and CR. Limit switch CD opens responsive to actuator 412 reaching a fully extended position, while limit switch CR opens responsive to actuator 412 reaching a fully retracted position.

With both the depress coil D and release coil R de-energized, actuator 412 stays in its last position, which tends to hold clutch 120 depressed to whatever extent actuator 412 had last driven the clutch pedal to be depressed, if at all. However, neither actuator 412 nor the mechanical linkage connecting actuator 412 to clutch 120 prevent the clutch pedal from being further manually depressed if the pedal is not already fully depressed.

Figure 5:
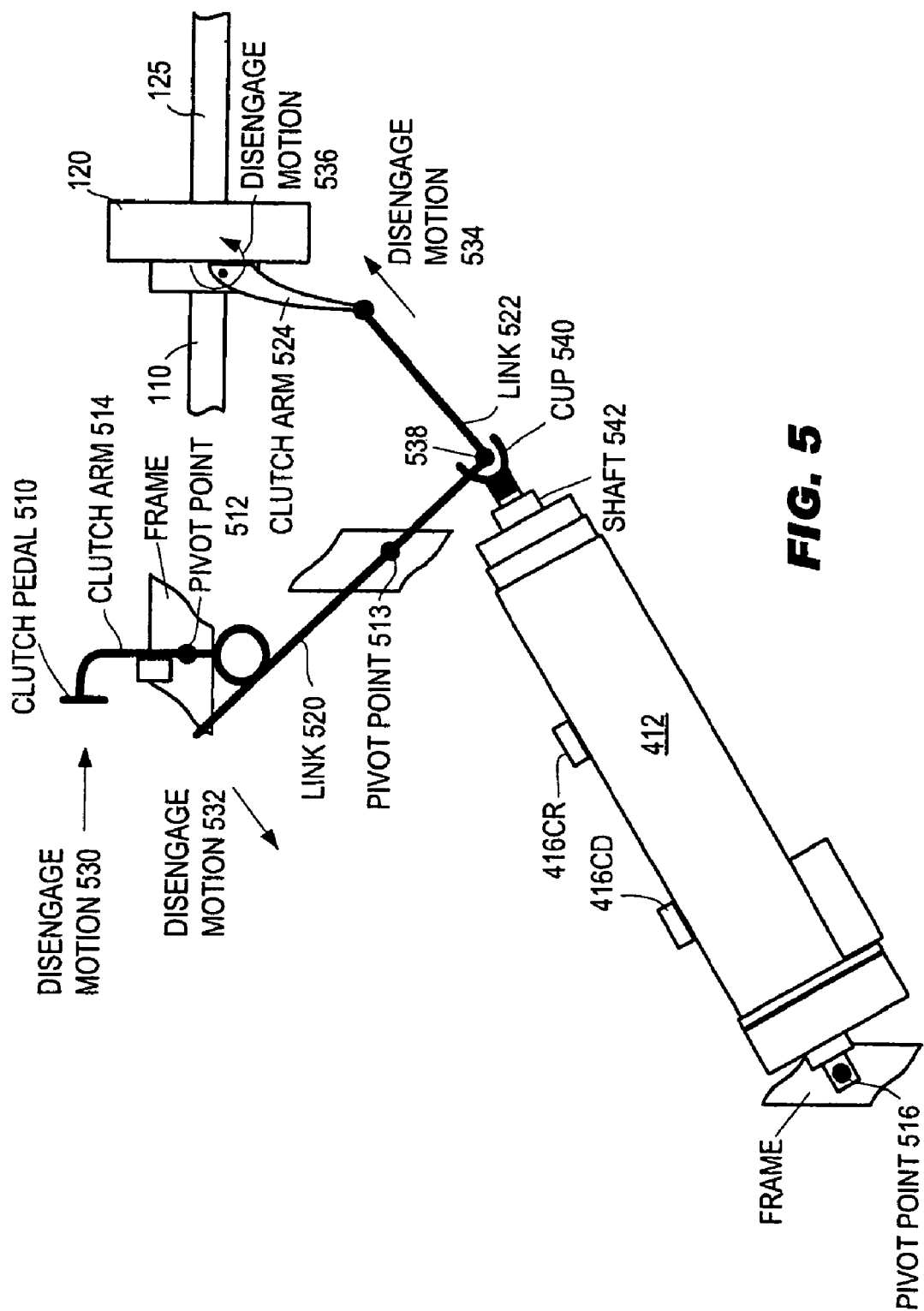
FIG. 5 illustrates certain aspects of an actuator and linkage to a main engine clutch for the vehicle of FIG. 3, according to an embodiment of the present invention.

Referring now to FIG. 5, linkage of actuator 412 to clutch 120 is further illustrated. It should be appreciated that the illustration is generally indicative of linkage, but is somewhat schematic in nature. That is, in FIG. 5 some mechanical details may be omitted or depicted figuratively in order to more clearly depict particular features and aspects of how the illustrated arrangement operates.

In addition to depicting actuator 412 of the present invention and its associated linkage, FIG. 5 also depicts conventional linkage for conventional clutch pedal 510 and conventional clutch 120, as follows. In order to disengage clutch 120 a driver conventionally depresses conventional clutch pedal 510 in the vehicle cab, thereby causing disengage motion 530. Clutch pedal 510 is on clutch arm 514, which is rotatably fixed to pivot point 512, so that disengage motion 530 transmits disengage motion 532 via clutch arm 514 to link 520. Link 520 has a distal end opposite the engagement of link 520 to clutch arm 514 and rotatably connected 538 to link 522, as shown. Also, link 520 is rotatably fixed to pivot point 513. Thus, link 520 transmits disengage motion 532 to link 522, causing disengage motion 534 in link 522. Link 522 has a distal end opposite its coupling to link 520 and rotatably connected to clutch arm 524, which is rotatably coupled to clutch 120 and engages a throw out bearing (not shown) of clutch 120. Thus link 520 transmits disengage motion 534 to clutch arm 524, causing disengage motion 536 by clutch arm 524, which causes the throw out bearing of clutch 120 to disengage clutch 120, thereby disengaging crank shaft 110 from transmission input shaft 125.

According to the illustrated embodiment of the present invention, actuator 412 and its associated linkage are added to the conventional linkage described in the paragraph above, as follows. Actuator 412 is rotatably secured at one end to the chassis of the vehicle at pivot point 516. An extendable/retractable shaft 542 of actuator 412 (shown in FIG. 5 in its fully retracted position) at the other end of actuator 412 is secured by cup 540 to connection 538 of link 520 and 522, such that links 520 and 522 have sufficient freedom of movement to allow conventional operation by foot pedal 510, as described immediately above, but still enabling actuator 412 shaft 542 to also transmit disengage motion 534 to link 522 by driving shaft 542 toward its fully extended position.

To reiterate, the illustrated arrangement of FIG. 5 allows freedom for conventional movement of links 520 and 522 for conventional clutch pedal 510 operation of clutch 120 without extending or retracting shaft 542 of actuator 412, which has been added to the conventional linkage between clutch 120 and clutch pedal 510. That is, cup 540 captures coupling 538 loosely enough to permit this freedom of conventional movement but tightly enough so that shaft 542 remains engaged with coupling 538 throughout the range of conventional motion of clutch pedal 510 and the corresponding range of motion of coupling 538. Also, this maintained engagement enables actuator 412 to provide an alternative means for disengaging and reengaging clutch 120. For disengaging, actuator 412 drives link 522 in disengaging motion 534 by extending shaft 542. The conventional clutch 120 includes a spring return mechanism or mechanisms (not explicitly shown in FIG. 5) such that clutch 120 reengages merely by the retracting of shaft 542. That is, the spring return mechanism of clutch 120 moves clutch arm 524 to the reengaged position such that engagement of cup 540 and coupling 538 is maintained even though shaft 542 retracts.

Limit switches 416CR and 416CD mounted on actuator 412 sense the position of shaft 542, as will be further explained herein below.

Referring again to FIG. 4 along with FIGS. 3A and 3B, system 160 includes a relay coil C wired to the 12 VDC supply of battery 310 in series with normally open contacts KR3 of relay KR. Thus, relay coil C picks up responsive to relay coil KR picking up and making contacts KR3. As previously described, vehicle diesel engine switch 402 not in the "run" position drops out relay V, making normally closed contacts V1, which picks up relay coil KR if electronic traction system switch 404 is in the "run" position. Thus, through the action of relays KR and V, relay C picks up responsive to vehicle diesel engine switch 402 not in the "run" position and electronic traction system switch 404 in the "run" position. is, the making of contacts KR3 provides a signal indicating initializing of an "electric traction" operating mode, i.e., a mode in which movement, i.e., traction, of vehicle 300 is powered by electrical motor 150.

Relay C has normally open contacts C1 in series with actuator 412 depress coil D and actuator limit switch 416 CD. Thus, contacts C1 make responsive to relay C picking up and this energizes the depress coil D and causes actuator 412 to drive toward the fully extended position, provided that clutch actuator 412 is not fully extended so that limit switch 416 CD is closed. Once actuator 412 reaches the fully extended position, limit switch 416 CD opens and actuator 412 depress coil D responsively drops out.

Once actuator 412 moves away from the fully retracted position, actuator limit switch 416 CR closes so that actuator 412 release coil R may be energized to once again retract actuator 412 when needed. However, responsive to relay C picking up, normally closed contacts C2 break so that 412 release coil R will not be energized. In this manner, relay C prevents actuator 412 from being retracted unless either i) vehicle diesel engine switch 402 is in the "run" position, which picks up relay V which drops out rely KR, which, in turn, drops out relay C, or else ii) electronic traction system switch 404 is in the "off" position, which drops out relay KR, which, in turn, drops out relay C. But responsive to either vehicle diesel engine switch 402 being turned to the "run" position or electronic traction system switch 404 being turned to the "off" position, relay C will drop out, which makes contacts C2 so that actuator 412 release coil R will responsively be energized via contacts C2. This drives actuator 412 toward the retracted position until limit switch 416 CR breaks upon sensing that actuator 412 is fully retracted.

Controls Relating to Operation of Braking and Steering Systems

In addition to the above described controls, system 160 has controls for ensuring operability of the system 304 braking and steering components when in the electric traction system mode of operating.

As previously mentioned, the conventional braking system for vehicle 300 includes air reservoir 347 and compressor 346 driven by internal combustion engine 302 to supply pressurized air for operating the brakes. Control system 160 provides a mechanism by which air pressure is supplied for braking even if engine 302 is shut off. Specifically, control system 160 provides a mechanism by which if air pressure for the vehicle's conventional braking system falls below a certain predetermined limit, then if the driver depresses the vehicle's conventional foot throttle, a supplemental air compressor motor 350 turns on to provide supplemental compressed air for operation of the vehicle's conventional brake system.

As also previously mentioned, the conventional steering system for vehicle 300 includes hydraulic pump 354 driven by internal combustion engine 302 to supply hydraulic fluid for operating power steering of vehicle 300. Control system 160 also provides a mechanism by which hydraulic fluid is pumped for steering even if engine 302 is shut off. Specifically, control system 160 provides a mechanism by which if the steering wheel of the vehicle is turned left or right beyond predetermined limits, then if the driver depresses the vehicle's conventional foot throttle, a supplemental hydraulic pump motor 358 turns on to drive pump 356 to provide supplemental hydraulic fluid pressure for operation of the vehicle's conventional steering system.

Specific details of controls 160 relating to operation of the braking system are as follows. Foot throttle limit switch FTLS 420 is operable to close its contacts responsive to sensing that the driver has depressed the vehicle's conventional foot throttle. FTLS 420 is in series in the 12 VDC supply with a relay T, so that responsive to FTLS 420 making, contact relay T picks up. Relay T picking up initiates demand for compressed air for the conventional vehicle braking system and for hydraulic fluid for the conventional vehicle steering system, as follows.

According to the illustrated embodiment of control system 160 of the present invention, an air pressure switch 418 is coupled to air supply reservoir 347. Switch 418 makes responsive to sensing that air pressure in reservoir 347 has fallen below a predetermined limit, e.g., 100 psi. Normally open contacts T1 of relay T are in series in the 12 VDC supply with air pressure switch 418. Also, the coil of relay A is in series with T1 and switch 418.

Relay A is for initiating demand for supplemental compressed air for the conventional vehicle braking system. That is, relay A has normally open contacts A1 in series in a 24 VDC supply with auxiliary air compressor motor 350. Responsive to T1 and switch 418 making, relay A picks up, making contacts A1 and energizing brake system auxiliary air compressor motor 350. In summary, responsive to the driver depressing the vehicle's conventional foot throttle, if air pressure falls below 100 psi, for example, auxiliary air compressor motor 350 turns on to provide more air for operation of the vehicle's conventional brake system.

Specific details of controls 160 relating to operation of the steering system are as follows. Normally open contacts T1 of relay T are also in series in the 12 VDC supply with parallel connected steering arm limit switches 414SRL and 414 SRR. Also, the coil of relay S is in series with T1 and parallel connected switches 414SRL and 414 SRR, which are mounted on the vehicle's conventional steering arm in such a way that switch 414SRL makes responsive to the steering wheel being turned to the left beyond a certain predetermined limit and switch 414 SRR makes responsive to the steering wheel being turned to the right beyond a certain predetermined limit.

Relay S is for initiating demand for supplemental hydraulic fluid pressure for the conventional vehicle steering system. That is, relay S has normally open contacts S1 in series in a 24 VDC supply with steering system auxiliary hydraulic pump motor 358. Responsive to T1 and switch 414SRL or 414 SRR making, relay S picks up, making contacts S1 and energizing steering system supplemental hydraulic pump motor 358. In summary, responsive to the driver depressing the vehicle's conventional foot throttle, if the steering wheel of the vehicle is turned left or right beyond certain limits, auxiliary hydraulic pump motor 358 turns on to provide more hydraulic fluid pressure for operation of the vehicle's conventional steering system.

General Remarks Regarding Controls

Note that in FIG. 4 there are three different voltage system, 12 VDC, which is a conventional ICE starter voltage system, 144 VDC and 24 VDC. Higher voltage systems are desirable for providing larger power delivery at relatively lower current. It is advantageous that relays such as KR, KG, C, etc. provide voltage isolation and current interrupting capacity, in addition to the logic function they perform. For example, it is desirable not to route voltages above 12 VDC in the cabin of a vehicle.

Control Modifications and Variations

The description of the present embodiment has been presented for purposes of illustration, but is not intended to be exhaustive or to limit the invention to the form disclosed. Many modifications and variations will be apparent to those of ordinary skill in the art. For example, controls have been described herein above in the context of relays having corresponding control-related processes in the nature of relay logic. It should be appreciated that the same logical processes described above may be achieved with different combinations of relays. For example, with appropriate adjustments it is possible to provide essentially a logical process implemented either by a relay that energizes to initiate an action or a relay that deenergizes to initiate the action. Choices may vary depending on a variety of factors, including, for example, complexity and desired failure mode.

Also, what is shown herein above as relays and relay logic may be implemented at least partly in the form of an embedded controller or other form of computer system having corresponding control-related processes in the nature of a computer program. Such a computer system and control-related processes may be incorporated in the above described motor controller, for example. Further, discrete sensors 330 are shown herein for actuating various dedicated relays. The signals provided by sensors 330 may be available on an original equipment data bus supplied by the vehicle manufacturer for input to a computer of control system 160.

Figure 6:
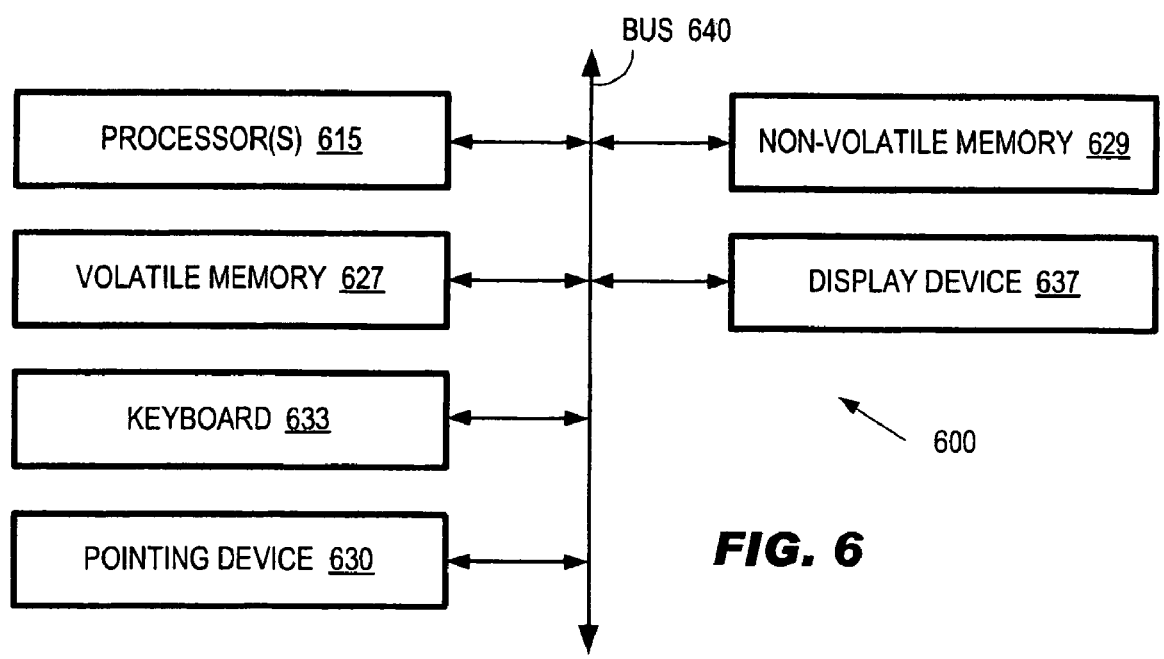
FIG. 6 illustrates a computer system in which at least aspects of control processes of the invention may be implemented, according to an embodiment of the present invention.

Referring now to FIG. 6, a computer system 600 in which control-related processes of the present invention may be implemented is illustrated, according to an embodiment of the present invention. It should be understood that the term "computer system" is intended to encompass any device having a processor that executes instructions from a memory medium, regardless of whether referred to in terms of an embedded controller, microcontroller, personal computer system (hardened or otherwise), or in some other terminology. Computer system 600 includes processor or processors 615, a volatile memory 627, e.g., RAM and a nonvolatile memory 629. Memories 627 and 629 store program instructions (also known as a "software program"), which are executable by processors 615, to implement various embodiments of a software program in accordance with the present invention. Processor or processors 615 and memories 627 and 629 are interconnected by bus 640. An input/output adapter (not shown) is also connected to bus 640 to enable information exchange between processors 615 and other devices or circuitry. System 600 is also adapted for at least temporary connection of a keyboard 633, pointing device 630, e.g., mouse, and a display device 637.

In the illustrated embodiment, nonvolatile memory 629 may include a disk for data storage and an operating system and software applications. In other embodiments, nonvolatile memory 629 is not necessarily a disk. The operating system may even be programmed in specialized chip hardware. Memory 629 also includes ROM, which is not explicitly shown, and may include other devices, which are also not explicitly shown, such as tapes.

Storing of data may be performed by one or more processes of computer system 600 and may include storing in a memory, such as memory 627 or 629, of the same computer system 600 on which the process is running or on a different computer system.

Additionally, at least some of the control-related processes of the present invention are capable of being distributed in the form of a computer readable medium of instructions executable by a processor to perform a method, i.e., process, such as described herein above. Such computer readable medium may have a variety of forms. The present invention applies equally regardless of the particular type of signal bearing media actually used to carry out the distribution. Examples of tangible computer readable media include recordable-type media such a floppy disk, a hard disk drive, a RAM, and CD-ROMs. Examples of transmission-type media include digital and analog communications links.

Various embodiments implement the one or more software programs in various ways, including procedure-based techniques, component-based techniques, and/or object-oriented techniques, among others. Specific examples include XML, C, C++ objects, Java and commercial class libraries. Those of ordinary skill in the art will appreciate that the hardware depicted herein may vary depending on the implementation. The depicted example is not meant to imply architectural limitations with respect to the present invention.

Many more modifications and variations will be apparent to those of ordinary skill in the art. For example, herein above it was described to vary voltage to the electric motor, which permits smoothly changing speed of the vehicle responsive to a variable demand signal. In an embodiment of the present invention, the controls may be operable to bump the electric motor for moving the vehicle in jerks, i.e., simply energize and deenergize the electric motor at a low frequency. The motor controller may accomplish this bumping responsive to an on-off demand signal.

Securing APU on Vehicle

Referring again to FIG. 3A, fuel cell 180 may be included other things in an auxiliary power unit ("APU") secured behind a cabin of vehicle 300 on a frame of a tractor portion thereof. The cabin also rides on the frame. The APU includes a rectangular housing for fuel cell 180 bolted to respective air springs located directly below four corners of the housing. APU further includes a spreader to which air springs are bolted. Also two coil springs are connected to the spreader by respective eyebolts bolted to one side of the housing near respective corners, such that the connections of the coil springs at spreader are located so as to keep coil springs extended downward from the bottom of housing and outward. In addition to the coil springs being held by the spreader in a manner extending outward and downward from the bottom of housing, the coil springs are also somewhat stretched by the spreader, but are well within their elastic limit. In this way, the springs are held in tension and tend to provide forces opposing one other and keeping the housing centered above and pulled down securely toward air the springs.

The air springs are interconnected by an air supply line having a connection via a pressure regulator for connecting the air springs to the conventional compressed air system included in subsystem 304 for brakes of vehicle 300. In this manner, after the spreader of the APU is bolted to the frame, the air springs may be inflated from the compressed air system, which adds to the tension of the coil springs and thereby more securely keeps the housing centered above and pulled down toward the air springs. It is advantageous that the housing is thus secured to the frame of vehicle 300 without any rigid members, or even piston-type shock absorbers, that can directly transfer the shocks of bumps and jerks from the frame to the housing. Although shock absorbers do, of course, tend to absorb such shocks in a single direction, they do tend to prevent movement in some directions, so that they do have a greater tendency to transfer forces from some directions than does the above described arrangement. Conventional air springs that are suitable for the above described use are available, for example, from McMAster-Carr.

Figure 7:
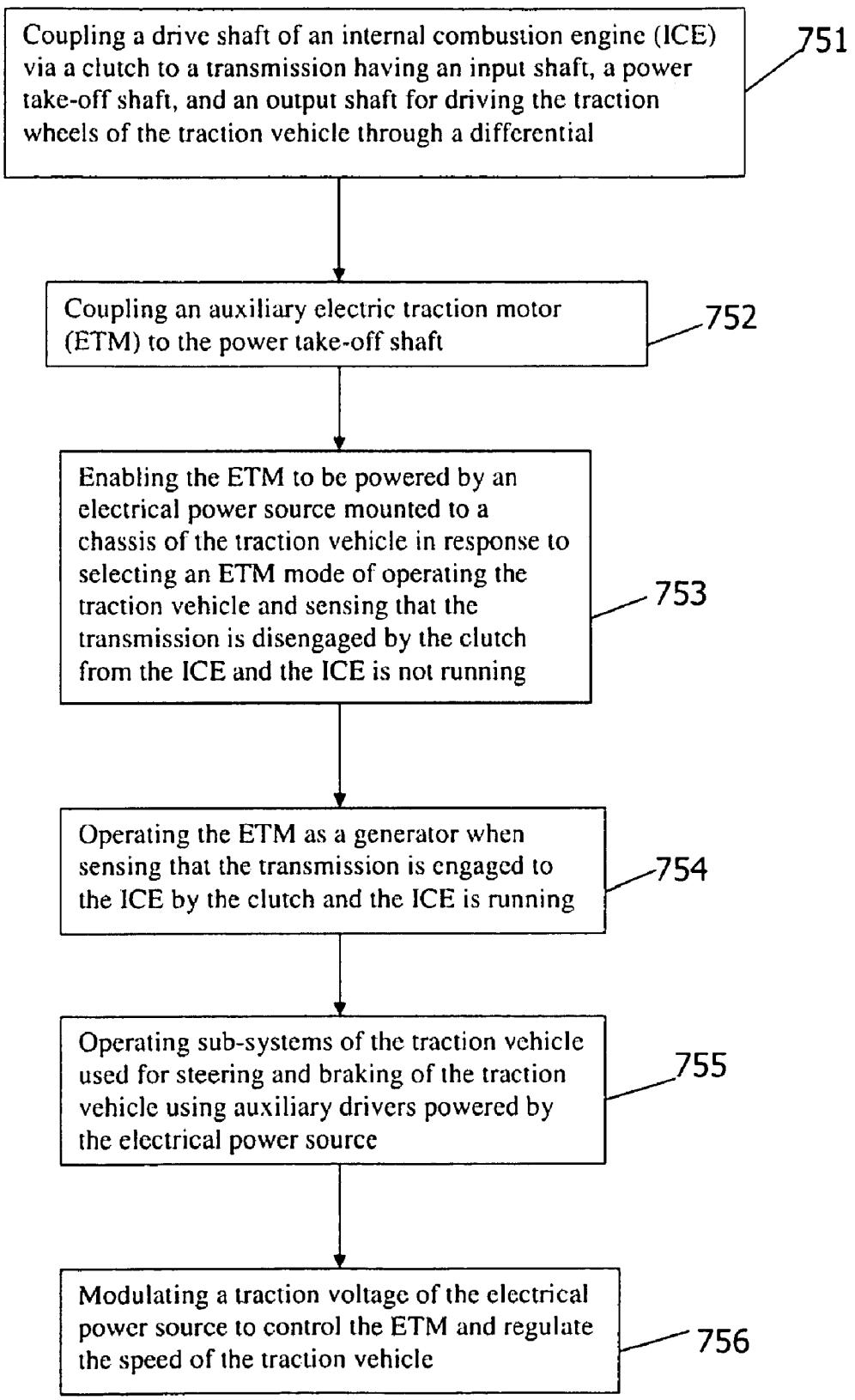
FIG. 7 is a flow diagram of method steps used in embodiments described herein.

FIG. 7 is a flow diagram of method steps used in embodiments for operating a traction vehicle. Instep 351, a drive shaft of an internal combustion engine (ICE) is coupled via a clutch to a transmission having an input shaft, a power take-off shaft, and an output shaft for driving traction wheels of the traction vehicle through a differential. In step 352, an auxiliary electric traction motor (ETM) is coupled to the power take-off shaft. In step 353, the ETM is enabled to receive power from an electrical power source mounted to a chassis of the traction vehicle in response to selecting a ETM mode of operating the traction vehicle and sensing that the transmission is disengaged by the clutch from the ICE and the ICE is not running. In step 354, the ETM is enabled to operate as a generator when the transmission is engaged to the ICE by the clutch and the ICE is running. In step 355, sub-systems of the traction vehicle used for steering and braking of the traction vehicle are driven using auxiliary drivers powered by the electrical power source. In step 356, a traction voltage of the electrical power source is modulated to control the ETM and regulate a speed of the traction vehicle.

General Remarks

It should be appreciated from the foregoing that the present invention provides numerous useful benefits, including the following:

a conventional PTO may be added to a conventional transmission via a conventional PTO port to serve as a transfer device in a non-conventional manner for putting power into a vehicle drive train from an electric traction motor supplied by of an external source device, even when the vehicle's ICE is powered off;

a hydrogen fuel cell in a suitable auxiliary power unit mounted on a vehicle as herein disclosed is durable enough and provides sufficient energy such that it may be provided as the external source device in order to move even a very substantial load, such as a fully loaded tractor-trailer truck, over a substantial distance or for operation of substantial duration; and a battery may provide still further energy for instantaneous power demands and may be recharged at appropriate intervals of low or non-electric operation demand either by the fuel cell or by the ICE via reverse operation of the electric traction motor; and controls and auxiliary subsystems, including clutch actuation, auxiliary air and auxiliary hydraulic fluid subsystems, are disclosed to enable operation of the electric traction motor coupled to the drive train without interfering with, or opposition from, the conventional ICE, and to coordinate safe operation of existing subsystems of the vehicle with the electric traction motor and generator modes of operation.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention.

Unless clearly and explicitly stated, the claims that follow are not intended to imply any particular sequence of actions. The inclusion of labels, such as a), b), c) etc., for portions of the claims does not, by itself, imply any particular sequence, but rather is merely to facilitate reference to the portions.

What is claimed is:

1. A system having a drive train including an internal combustion engine ("ICE") coupled to an input shaft of a transmission having a power takeoff port, the system comprising:

an electric motor; and a transfer device coupling the electric motor to the transmission via the power takeoff port, the system being configured to enable the electric motor to selectively power an output shaft of the transmission during at least certain intervals when the internal combustion engine is powered off.

2. The system as recited in claim 1, comprising:

a source device for supplying power to the electric motor.

3. The system as recited in claim 2, wherein the source device comprises a fuel cell.

4. The system as recited in claim 2, wherein the source device comprises a battery.

5. The system as recited in claim 2, wherein the source device comprises:

a battery; and a fuel cell configured to charge the battery.

6. The system as recited in claim 4, wherein the system is configured to enable charging of the battery by the internal combustion engine when the internal combustion engine is powered on.

7. An electric traction system for a vehicle having an internal combustion engine coupled to a drive train, the drive train including a clutch coupled to an input of a transmission, the system comprising:

an electric motor;
a transfer device for transferring rotation of the motor to the transmission input for moving the vehicle;
a source device electrically coupled to the motor to supply power for the moving of the vehicle during at least certain intervals when the internal combustion engine is powered off;
a motor controller, wherein the source device is electrically coupled to the motor via the motor controller; and
controls configured to enable the moving of the vehicle selectively, wherein the controls are electrically coupled to, and operable with, the motor controller to de-energize the electric motor responsive to a shutdown signal, wherein the shutdown signal indicates operation of the internal combustion engine or a precursor to operation of the internal combustion engine, wherein the shutdown signal includes a clutch position signal.

8. The system as recited in claim 7, wherein the source device comprises:
a fuel cell.

9. The system as recited in claim 8, wherein the source device comprises:
a battery electrically coupled to the motor controller to supply electrical power for the electric motor, wherein the electrical coupling of the fuel cell to the electric motor is via the battery so that the fuel cell is operable to recharge the battery.

10. The system as recited in claim 7, wherein the source device comprises:
a battery.

11. The system as recited in claim 7, wherein the controls are electrically coupled to, and operable with, the motor controller to energize the electric motor responsive to a demand signal.

12. The system as recited in claim 11, wherein the demand signal is a variable demand signal and the energizing of the electric motor includes variable energizing such that speed of the vehicle is modulated responsive to the variable demand signal.

13. The system as recited in claim 11, wherein the controls include:
a throttle; and
a variable impedance device, wherein the energizing of the electric motor includes variable energizing and the demand signal includes a variable impedance signal from the variable impedance device, the impedance being varied responsive to the throttle.

14. The system as recited in claim 7, wherein the shutdown signal includes a signal for starting the internal combustion engine.

15. The system as recited in claim 7, wherein the shutdown signal includes an internal combustion engine rotation signal.

16. The system as recited in claim 7, wherein the shutdown signal includes an internal combustion engine ignition signal.

17. The system as recited in claim 7, wherein the controls comprise:
an actuator configured to automatically move the clutch to a position in which the internal combustion engine is disengaged from the transmission input responsive to a signal.

18. The system as recited in claim 7, wherein the controls comprise:
an actuator configured to automatically move the clutch to a position in which the internal combustion engine is disengaged from the transmission input responsive to a signal indicating initializing of an operating mode in which movement of the vehicle is powered by the electrical motor.

19. The system as recited in claim 7, wherein the system is configured for enabling charging of the battery by the internal combustion engine.

20. The system as recited in claim 19, wherein the configuration enabling charging of the battery by the internal combustion engine includes the transmission being engaged to the internal combustion engine via the clutch for mechanically transferring power from the internal combustion engine to the electric motor via the clutch, so that the electric motor is operable as a generator.

21. The system as recited in claim 7, wherein the vehicle includes an air compressor driven by the internal combustion engine for supplying air to a reservoir for a braking subsystem of the vehicle, and wherein the electric traction system comprises:
an auxiliary air compressor for supplying air to the reservoir during at least certain times when the internal combustion engine is powered off;
an auxiliary air electric motor for driving the auxiliary air compressor; and
an air pressure switch coupled to the reservoir for turning on the auxiliary air electric motor responsive to low air pressure.

22. The system as recited in claim 7, wherein the vehicle includes a hydraulic fluid pump driven by the internal combustion engine for supplying fluid to a steering subsystem of the vehicle, and wherein the electric traction system comprises:
an auxiliary hydraulic fluid pump for supplying fluid to the power steering subsystem during at least certain times when the internal combustion engine is powered off;
an auxiliary hydraulic fluid electric motor for driving the auxiliary hydraulic fluid pump; and
at least one limit switch coupled to the power steering subsystem for turning on the auxiliary hydraulic fluid electric motor responsive to a position of at least one component of the power steering subsystem.

23. The system as recited in claim 22, wherein the at least one component of the steering subsystem includes a steering arm.

24. The system as recited in claim 1, wherein the transmission has a case defining the power takeoff port for accessing the transmission input and the transfer device has a case fixed to the transmission case such that the transfer device engages the transmission input for transferring the rotation of the electric motor.

25. A drive system for a truck configured to haul cargo comprising:
an internal combustion engine (ICE) coupled to an input shaft of a transmission with an electric clutch, an output shaft of the transmission coupled to wheels of the trucks, wherein the transmission transmits power from the internal combustion engine to the truck wheels and to a power take-off port connected to a transfer gear box when the electric clutch engages the transmission to the internal combustion engine;
an electric traction motor (ETM) coupled to the transmission via the transfer gear box, wherein the electric traction motor is powered to drive the transmission in an ETM operating mode in response to an ETM mode control signal when the electric clutch disengages the transmission from the internal combustion engine in response to a clutch control signal;

a fuel cell coupled to an energy source and generating a DC output voltage electrically coupled to power the electric traction motor in response to ETM control signals;

an auxiliary battery electrically coupled to the DC output of the fuel cell, wherein the auxiliary battery provides electrical power to the electric traction motor in the ETM operating mode in response to the control signals;

one or more auxiliary drivers for generating working air or fluids for operating sub-systems of the truck, wherein the auxiliary drivers are driven by auxiliary motors in response to auxiliary system control signals; and a control system coupled to, the auxiliary battery, the auxiliary motors, the electric traction motor, operating sensors, and the fuel cell DC output voltage, wherein the control system generates the ETM control signals and the auxiliary system control signals and controls the electric traction motor, the auxiliary drivers, and the electric clutch, in response to cabin truck controls setting truck operation modes.

26. A drive system for a truck configured to haul cargo comprising:

an internal combustion engine (ICE) coupled to an input shaft of a transmission with an electric clutch, wherein the transmission transmits power from the internal combustion engine (1) through an output shaft of the transmission to the truck wheels, (2) and to a power take-off port configured to couple to a transfer gear box, when the electric clutch engages the transmission to the internal combustion engine;

truck sub-systems configured to deliver pressurized air and fluid to control operations of the truck when the internal combustion engine is running;

auxiliary drivers coupled to deliver the pressurized air and fluid to the truck sub-systems to control operations of the truck in response to auxiliary control signals when the internal combustion engine is not running;

an auxiliary electric traction system receiving a source of energy and generating (1) a first output voltage driving an electric traction motor (ETM) coupled to the power take-off port with the transfer gear box, (2) a second output voltage for driving a first electric motor in the auxiliary drivers that is coupled to a hydraulic pump to produce the pressurized fluid, (3) a third output voltage for driving a second electric motor in the auxiliary drivers coupled to an air compressor to produce the pressurized air, and (4) a fourth output voltage coupled to recharge a battery coupled to an electrical system of the truck; and a controller, in the auxiliary electric traction system, coupled to cabin controls and generating the auxiliary control signals for varying the first, second, third and fourth output voltages to control movement of the truck when the electric clutch disconnects the internal combustion engine from the transmission.

27. The system of claim 26, wherein when the internal combustion engine is operating the truck, levels of the pressurized air and the pressurized fluid are set by ICE controls, and the pressurized air is directed to an air brake sub-system of the truck using a brake pedal of the truck, and the pressurized fluid is directed to a power steering sub-system of the truck using a steering wheel coupled to a steering arm.

28. The system of claim 26, further comprising a fuci cell in the auxiliary electric traction system that outputs at least one DC voltage output in response to receiving the source of energy.

29. The system of claim 28, wherein electronic power regulator circuitry receives the DC voltage output of the fuel cell and generates the first, second, third and fourth output voltages in response to the auxiliary control signals from the controller.

30. The system of claim 27, wherein the pressurized air is connected to the air brake sub-system with a quick disconnect air pressure coupling, and the pressurized fluid is connected to the power steering sub-system with a quick disconnect hydraulic line connector.

31. The system of claim 30, wherein the controller is a stored program controller having a sequence of instructions recorded in a computer readable medium that are executed to generate the auxiliary control signals in response to sensor input signals and a signal indicating the electric traction motor is operating the truck.

32. The system of claim 26, wherein the electric traction motor is an AC motor.

33. The system of claim 29, wherein the first output voltage is an AC voltage generated by a DC to AC converter.

34. The system of claim 31, wherein the stored program controller comprises:
a processor; and
a storage device having the computer readable medium that is coupled to the processor.

35. The system of claim, 33 wherein the auxiliary electric traction system comprises an auxiliary battery having an output coupled to the fuel cell to power the electric traction motor when the DC voltage output is below a predetermined level and to receive charge from the fuel cell DC output voltage when the DC voltage output is above the predetermined level.

36. The system of claim 32, wherein the electric traction motor is configured as a generator in an ICE mode and generates an AC output voltage that is coupled to the controller to charge the battery when the internal combustion engine is operating the truck.

37. The system of claim 28, wherein the fuel cell is a hydrogen fuel cell and the source of energy comprises pressurized hydrogen and pressurized air.

38. A truck for hauling cargo comprising:
a cabin for housing an operator;
a chassis coupled to the cabin and configured with wheels for transporting the cargo; and
a bed configured to haul the cargo, the truck operated with a drive train having (1) an internal combustion engine coupled to an input shaft of a transmission with a clutch, wherein the transmission transmits power from the internal combustion engine to the truck wheels via an output shaft of the transmission, and to a power take-off shaft configured to couple to a transfer gear box when the clutch engages the input shaft of the transmission to the internal combustion engine, (2) truck sub-systems configured to deliver pressurized air and pressurized fluid to control operations of the truck when the internal combustion engine is running, (3) auxiliary drivers coupled to deliver the pressurized air and pressurized fluid to the truck sub-systems to control operations of the truck in response to auxiliary control signals when the internal combustion engine is not running, (4) an auxiliary electric traction system receiving a source of energy and generating, a first output voltage driving an electric traction motor coupled to the power take-off shaft with the transfer gear box, a second output voltage for driving a first electric motor in the auxiliary drivers that is coupled to a hydraulic pump to produce the pressurized fluid, a third output voltage for driving a second electric motor in the auxiliary drivers coupled to an air compressor to produce the pressurized air, and a fourth output voltage coupled to recharge a battery coupled to an electrical system of the truck, and (5) a controller, in the auxiliary electric traction system, coupled to cabin controls and generating the auxiliary control signals for varying the first, second, third and fourth output voltages to control movement of the truck when the clutch disconnects the internal combustion engine from the transmission.

39. A drive system for a truck configured to haul cargo comprising:
an internal combustion engine coupled to an input shaft of a transmission with an electric clutch, wherein the transmission transmits power through its output shaft from the internal combustion engine to the truck wheels, and wherein the transmission transmits power from the internal combustion engine to a transfer gear box through a power take-off shaft in the transmission, the power take-off shaft configured to couple to the transfer gear box when the electric clutch engages the transmission to the internal combustion engine;
an electric traction motor ETM coupled to an input of the transfer gear box, wherein the electric traction motor is powered to drive the transmission in an operating mode in response to an ETM mode control signal when the electric clutch disengages the transmission from the internal combustion engine in response to a clutch control signal;
an auxiliary battery electrically coupled to an output of a fuel cell, wherein the auxiliary battery provides electrical power to the electric traction motor in the ETM operating mode in response to the mode control signal;
one or more auxiliary drivers for generating working air or fluids for operating sub-systems of the truck, wherein the auxiliary drivers are driven by auxiliary motors in response to auxiliary system control signals; and
a control system coupled to the auxiliary battery, the auxiliary motors, the electric traction motor, operating sensors, and the fuel cell output, wherein the control system generates the ETM mode control signal and the auxiliary system control signals and controls the electric traction motor, the auxiliary drivers, and the electric clutch, in response to cabin truck controls setting truck operation modes.

40. A method of operating a traction vehicle comprising:
coupling a drive shaft of an internal combustion engine ICE via a clutch to an input of a transmission, wherein the transmission has (1) an output shaft for driving traction wheels of the traction vehicle through a differential, and (2) a power take-off port of the transmission;
coupling an electric traction motor (ETM) to the power take-off port;
enabling the electric traction motor to be powered by an electrical power source mounted to a chassis of the traction vehicle in response to selecting a ETM mode of operating the traction vehicle and sensing that the transmission is disengaged by the clutch from the internal combustion engine and the internal combustion engine is not running;
operating the electric traction motor as a generator when sensing that the transmission is engaged to the internal combustion engine by the clutch and the internal combustion engine is running;
operating sub-systems of the traction vehicle used for steering and braking of the traction vehicle using auxiliary drivers powered by the electrical power source; and
modulating a traction voltage of the electrical power source to control the electric traction motor and regulate a speed of the traction vehicle.

41. The method of claim 40 further comprising charging one or more batteries using an output of the electric traction motor when operated as a generator in a ICE mode of operating the traction vehicle.

42. The method of claim 41, wherein a starter battery for the internal combustion engine of the traction vehicle is charged when the electric traction motor is operated as a generator.

43. The method of claim 41, wherein an auxiliary battery electrical power source is charged when the electric traction motor is operated as a generator.

44. The method of claim 40, wherein the auxiliary drivers are auxiliary electric motors coupled to drive a compressor to deliver pressurized air and to drive a hydraulic pump to deliver pressurized fluid to the sub-systems of the traction vehicle.

45. The method of claim 44, wherein voltages from the electrical power source are coupled to the auxiliary electric motors and modulated to control pressures of the pressurized air and pressurized fluid in response to pressure sensors in air brake and power steering sub-systems of the traction vehicle.

46. The method of claim 40, wherein the clutch is an electric clutch operated by motion of a clutch petal in an ICE mode of operating the traction vehicle and the electric clutch is operated by a clutch control signal in the ETM mode.

47. The method of claim 40, wherein the power take-off is coupled to the electric traction motor using a transfer gear box.

48. The method of claim 40, wherein the traction voltage is modulated in response to an electrical signal generated by a transducer sensing a position of a throttle configured to control power of the internal combustion engine when operating the traction vehicle.

49. The method of claim 40, further comprising operating an air conditioning sub-system of the traction vehicle using auxiliary drivers powered by the electrical power source.

50. The method of claim 49, wherein the auxiliary drivers driving the air conditioning sub-system include a compressor electric motor coupled through an electric clutch to an air conditioning compressor and an electric fan motor coupled to deliver an air flow to condenser coils of an air conditioning condenser.

51. The method of claim 40, wherein the clutch is an electric clutch manually operated by motion of a clutch petal in an ICE mode of operating the traction vehicle and the electric clutch is electrically operated by a clutch control signal in the ETM mode.

52. A drive system for a vehicle, wherein the vehicle has a drive train including an internal combustion engine coupled to a transmission input via a clutch, wherein the transmission has a power takeoff port, the drive system comprising:
an electric motor; and
a transfer device coupling the electric motor to the transmission via the power takeoff port, the drive system being configured to enable the electric motor to selectively power an output shaft of the transmission during at least certain intervals when the internal combustion engine is powered off and disengaged via the clutch from the transmission.

53. A vehicle motive system comprising:
a drive train including:
an internal combustion engine;
an original equipment manufacturer manual transmission coupled to the internal combustion engine; and
a power takeoff port accessible on the original equipment manufacturer manual transmission;

an electric motor-generator that functions selectively as a motor and a generator;

an energy source connected to the electric motor-generator for energizing the electric motor-generator during operation as an electric motor; and a power exchange unit coupling the electric motor-generator with the original equipment manufacturer manual transmission through the power takeoff port, the power exchange unit configured to enable the electric motor-generator (1) to operate as the electric motor to drive the original equipment manufacturer manual transmission through the power exchange unit and power takeoff port at least during certain intervals when the internal combustion engine is powered off and (2) to operate as an electric generator when back driven by the original equipment manufacturer manual transmission through the power exchange unit to recharge the energy source during at least certain intervals when the internal combustion engine is powered on.

54. The system as recited in claim 53, wherein the energy source comprises a battery.

55. The system as recited in claim 53, further comprising:

a motor controller, wherein the energy source is electrically coupled to the electric motor via the motor controller; and controls configured to enable the driving of the original equipment manufacturer manual transmission selectively, wherein the controls are electrically coupled to, and operable with, the motor controller to energize the electric motor responsive to a demand signal.

56. The system as recited in claim 55, wherein the demand signal is a variable demand signal and the energizing of the electric motor includes variable energizing such that speed of the vehicle motive system is modulated responsive to the variable demand signal.

57. The system as recited in claim 55, wherein the controls include:

a throttle; and a variable impedance device, wherein the energizing of the electric motor includes variable energizing and the demand signal includes a variable impedance signal from the variable impedance device, the impedance being varied responsive to the throttle.

58. The system as recited in claim 55, wherein the controls are electrically coupled to, and operable with, the motor controller to de-energize the electric motor responsive to a shutdown signal, wherein the shutdown signal indicates operation of the internal combustion engine or a precursor to operation of the internal combustion engine.

59. The system as recited in claim 58, wherein the shutdown signal includes a signal for starting the internal combustion engine.

60. The system as recited in claim 58, wherein the shutdown signal includes a clutch position signal.

61. The system as recited in claim 58, wherein the shutdown signal includes an internal combustion engine rotation signal.

62. The system as recited in claim 58, wherein the shutdown signal includes an internal combustion engine ignition signal.

63. The system as recited in claim 55, wherein the controls comprise:

an actuator configured to automatically move a clutch to a position in which the internal combustion engine is disengaged from an input to the transmission responsive to a signal.

64. The system as recited in claim 55, wherein the controls comprise:

an actuator configured to automatically move a clutch to a position in which the internal combustion engine is disengaged from an input to the transmission responsive to a signal indicating initializing of an operating mode in which movement of the vehicle motive system is powered by the electric motor.

\* \* \* \* \*

UNITED STATES PATENT AND TRADEMARK OFFICE
CERTIFICATE OF CORRECTION

PATENT NO. : 7,600,595 B2  Page 1 of 1
APPLICATION NO. : 11/558786
DATED : October 13, 2009
INVENTOR(S) : Warner Olan Harris It is certified that error appears in the above-identified patent and that said Letters Patent is hereby corrected as shown below:

Column 18, Line 43 - In Claim 23, delete "the steering" and insert -- the power steering -- therefor.
Column 19, Line 7  - In Claim 25, delete "the control" and insert -- the ETM control -- therefor.
Column 19, Line 13 - In Claim 25, delete "motor ," and insert -- motor, -- therefor.
Column 19, Line 62 - In Claim 28, delete "fuci cell" and insert -- fuel cell -- therefor.
Column 20, Line 24 - In Claim 35, delete "claim, 33" and insert --claim 33, -- therefor.
Column 21, Line 19 - In Claim 39, delete "ETM" and insert -- (ETM) -- therefor.
Column 21, Line 21 - In Claim 39, delete "an operating" and insert -- an ETM operating -- therefor.
Column 21, Line 29 - In Claim 39, delete "the mode" and insert -- the ETM mode -- therefor.
Column 21, Line 44 - In Claim 40, delete "ICE" and insert -- (ICE) -- therefor.
Column 22, Line 3  - In Claim 41, delete "a ICE" and insert -- an ICE -- therefor.

Signed and Sealed this

Ninth Day of February, 2010

David J. Kappos
*Director of the United States Patent and Trademark Office*